United States Patent [19]

Takanabe et al.

[11] Patent Number: 4,675,676

[45] Date of Patent: Jun. 23, 1987

[54] MAP DISPLAY SYSTEM

[75] Inventors: Kazunori Takanabe, Kasugai; Masaki Yamamoto, Nagoya; Kenzo Ito, Okazaki; Hiroshi Fujinami, Anjo, all of Japan

[73] Assignee: Nippondenso Co. Ltd., Kariya, Japan

[21] Appl. No.: 587,655

[22] Filed: Mar. 8, 1984

[30] Foreign Application Priority Data

Mar. 9, 1983 [JP] Japan .................................. 58-38425
May 11, 1983 [JP] Japan .................................. 58-82385
May 24, 1983 [JP] Japan .................................. 58-91336

[51] Int. Cl.4 ........................ G08G 1/12; G01C 21/00
[52] U.S. Cl. .................................... 340/995; 340/990; 364/424; 364/449
[58] Field of Search ............... 340/988, 995, 750, 798, 340/990; 364/424, 449, 521, 460, 444; 73/178 R; 353/12; 358/103

[56] References Cited

U.S. PATENT DOCUMENTS

| 3,618,240 | 11/1971 | Pelin | 340/995 |
|---|---|---|---|
| 4,086,632 | 4/1978 | Lions | 340/995 |
| 4,312,577 | 1/1982 | Fitzgerald | 364/444 |
| 4,504,913 | 3/1985 | Miura et al. | 73/178 R |
| 4,511,973 | 4/1985 | Miura et al. | 340/995 |
| 4,513,377 | 4/1985 | Hasebe et al. | 340/990 |
| 4,514,810 | 4/1985 | Ito et al. | 340/990 |
| 4,527,155 | 7/1985 | Yamaki et al. | 340/995 |
| 4,532,514 | 7/1985 | Hatano et al. | 364/460 |
| 4,535,335 | 8/1985 | Tagami et al. | 340/988 |
| 4,543,572 | 9/1985 | Tanaka et al. | 364/449 |
| 4,571,684 | 2/1986 | Takanabe et al. | 340/995 |

FOREIGN PATENT DOCUMENTS

| 0066877 | 12/1982 | European Pat. Off. . |  |
|---|---|---|---|
| 0066998 | 12/1982 | European Pat. Off. . |  |
| 0118886 | 9/1984 | European Pat. Off. | 364/424 |
| 3235993 | 5/1983 | Fed. Rep. of Germany | 340/995 |
| 2100001 | 12/1982 | United Kingdom . |  |

Primary Examiner—James L. Rowland
Assistant Examiner—Brent A. Swarthout
Attorney, Agent, or Firm—Cushman, Darby & Cushman

[57] ABSTRACT

A vehicle map display system includes a control unit to manually or automatically display a reduced or enlarged map, from a reduced or enlarged map data storage device in accordance with the separating distance between the present position of a vehicle and a destination, on the whole or part of a display area of a display device which is provided with a sub-display area.

13 Claims, 48 Drawing Figures

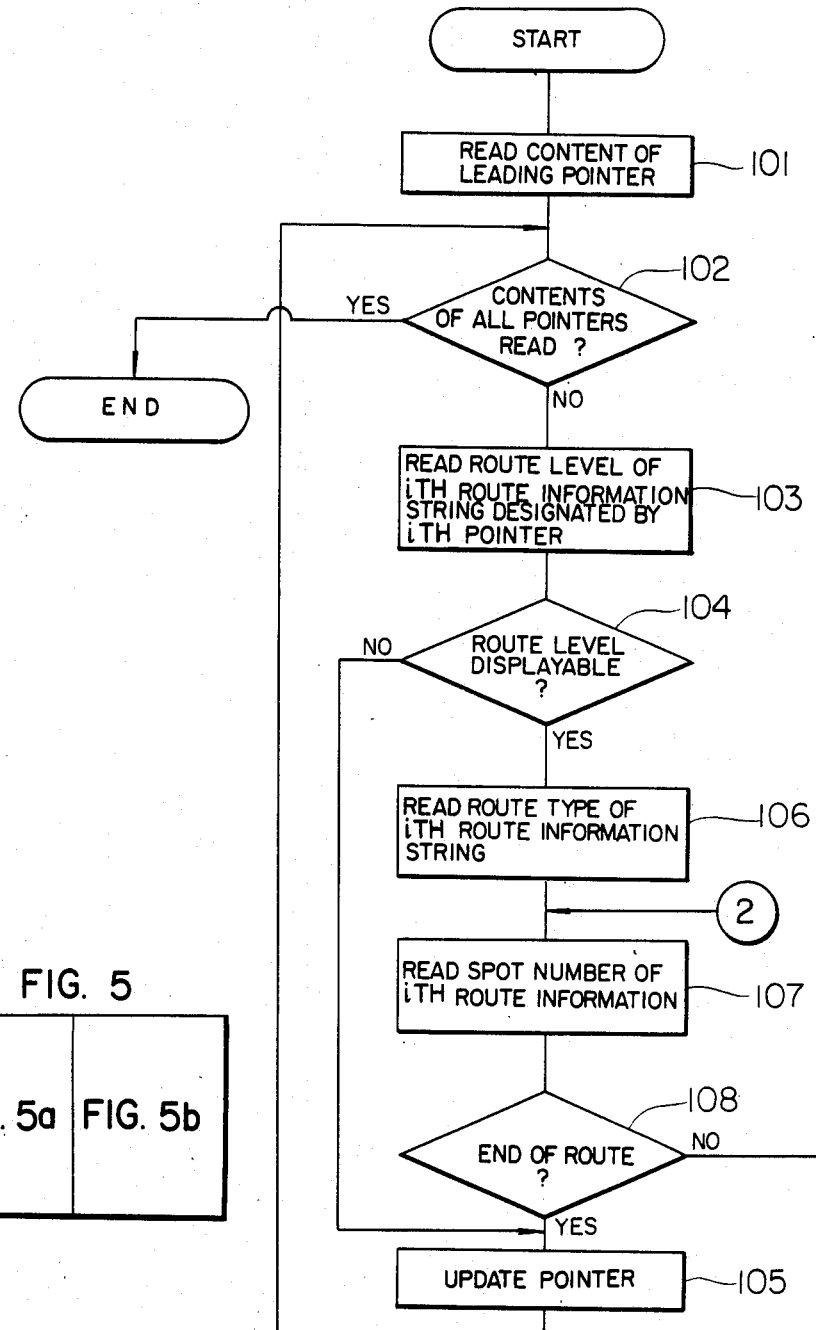

| (X1,Y1) \ (X2,Y2) | O | I | II | III | IV | V | VI | VII | VIII |
|---|---|---|---|---|---|---|---|---|---|
| O | × | × | × | × | ○ | ○ | × | ○ | ○ |
| I | × | × | × | ○ | ○ | ○ | ○ | ○ | ○ |
| II | × | × | × | ○ | ○ | × | ○ | ○ | × |
| III | × | ○ | ○ | × | ○ | ○ | × | ○ | ○ |
| IV | ○ | ○ | ○ | ○ | ○ | ○ | ○ | ○ | ○ |
| V | ○ | ○ | × | ○ | ○ | × | ○ | ○ | × |
| VI | × | ○ | ○ | × | ○ | ○ | × | × | × |
| VII | ○ | ○ | ○ | ○ | ○ | ○ | × | × | × |
| VIII | ○ | ○ | × | ○ | ○ | × | × | × | × |

1/1,000,000

1/500,000

1/200,000

1/200,000

1/500,000

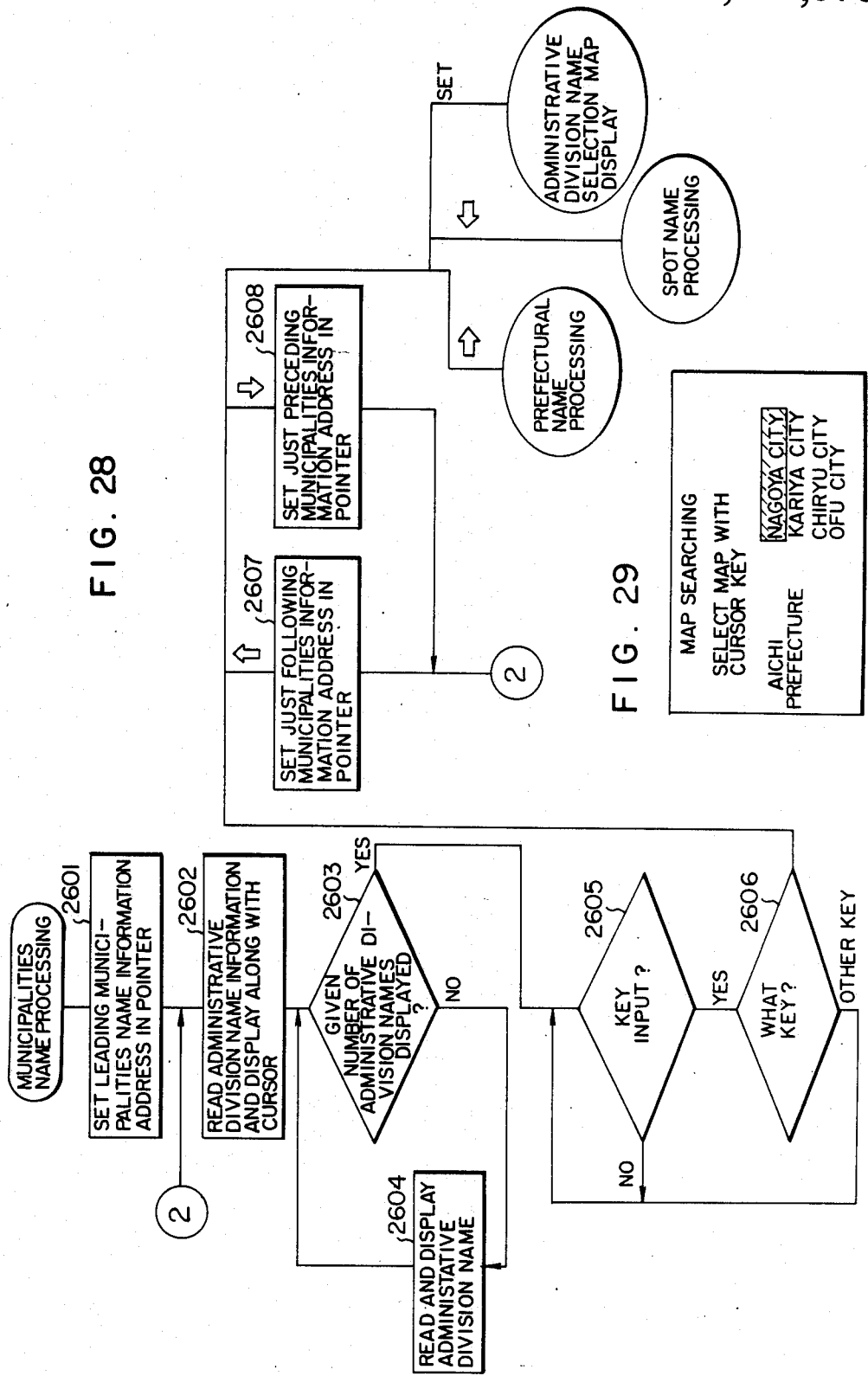

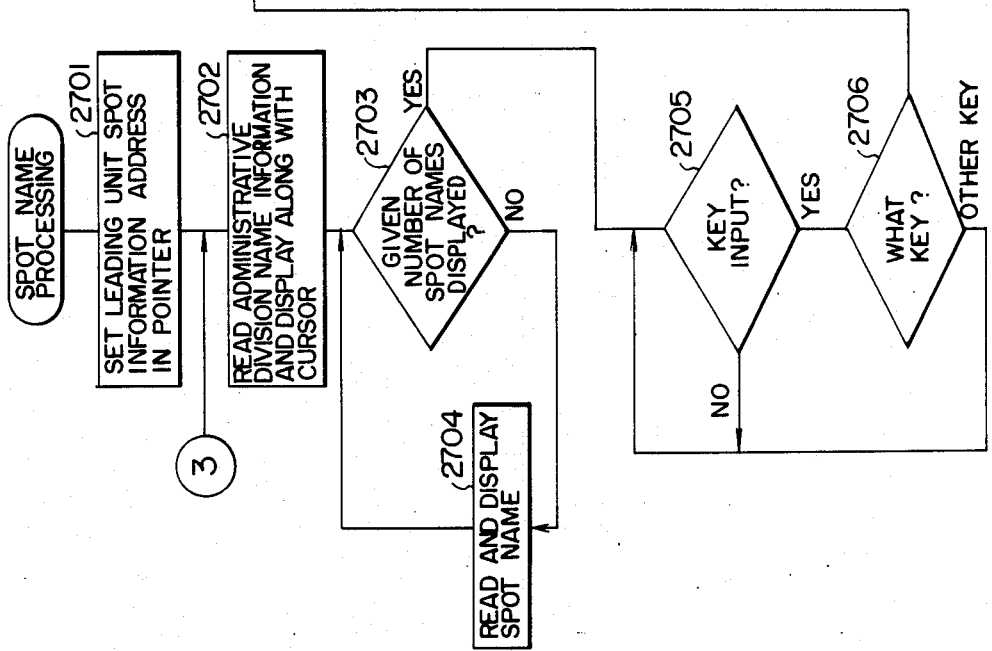
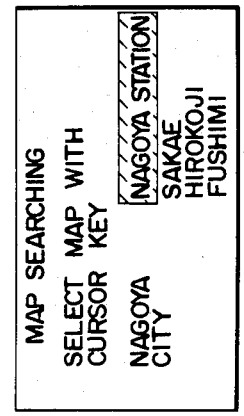
FIG. 30
FIG. 31

MAP DISPLAY SYSTEM

The present invention relates to a map display system for vehicles and more particularly to a map display system which is capable of manually or automatically enlarging or reducing a map to be displayed on a display in accordance with the separating distance between the present position of a vehicle and a destination while realizing an increased extent of map display and a reduced map data capacity and which is provided with a sub-display area.

Recently, systems have been developed in which a map is displayed to direct the movement of a vehicle such as an automobile. In the past, this type of map display system has been usually provided with the separate map data for each of maps to be displayed and therefore it tends to give rise to disadvantages that in order that a wide setting of the area of each map to be displayed may be ensured while retaining their details and that the displayed map may for example be enlarged or reduced as occasion demands thus providing a freedom of display pattern, the capacity of the map data as a whole will be increased with the resulting increase in the capacity of the map data storage medium, while on the other hand a limitation to the map data capacity tends to reduce the area on the whole of each map to be displayed or cause the displayed map to lose its details and so on.

Also, it is desirable that the displayed map is automatically enlarged as a vehicle comes near to its destination and contrary the displayed map is automatically reduced as the vehicle moves far away from the destination. However, the known map display systems for vehicles have had a limit to the display patterns of maps to be displayed and thus they have been incapable of changing the displayed map in accordance with the separating distance between the present position of a vehicle and its destination.

This type of known system has also been so designed that only a single map is displayed on the map display area of display means and thus the system tends to give rise to disadvantages that in order that the present position of a vehicle may be recognized as a spot on a wide map as well as a spot on a map which is a detailed one but showing a limited area in the vicinity of the present position of the vehicle, it is necessary to provide a plurality of map patterns drawn on different reduced scales and covering the same spot thus inevitably increasing the required data storage capacity and so on.

With a view to overcoming the foregoing deficiencies in the prior art, it is a first object of the present invention to provide a map display system for vehicles which is provided with a freedom of display pattern while making possible the enlargement of the area of each map to be displayed and a reduction in the required map data capacity.

It is a second object of the invention to provide a map display system for vehicles which automatically displays on a display a map on a reduced scale corresponding to the separating distance between the present position of a vehicle and its destination thus allowing it to serve as a readily usable road guide to the driver, etc.

It is a third object of the invention to provide a map display system for vehicles which is capable of simultaneously displaying a map of a wide area and a map of a limited area thereby providing a substantial guide to the travel of a vehicle.

To accomplish the first object of the invention, there is provided a map display system including: a map display; a map data storage medium including a spot information string indicative of the spots on maps in terms of spherical coordinates or rectangular coordinates with respect to specified spots and level information; selecting means for selecting one of a plurality of display modes relating to the reduced scales or densities of maps to be displayed; extracting means for extracting from the spot information string those spot information which are pertinent to the level corresponding to the display mode selected by the selecting means; and coordinate conversion means for converting the coordinates of each spot extracted by the extracting means to display coordinates.

To accomplish the second object of the invention, there is provided a map display system including: a display for displaying at least a map for vehicle travel guiding purposes and the present position of a vehicle; a map data storage medium storing map data; detecting means for detecting the driving conditions of the vehicle; present position computing means responsive to the detection signals of the detecting means to compute the present position of the vehicle; destination selecting means for selecting a destination; reduced scale computing means for computing the separating distance between the destination selected by the destination selecting means and the present position obtained by the present position computing means and selecting the reduced scale of a map to be displayed on the display in accordance with the separating distance and; map display control means responsive to the map reduced scale determined by the reduced scale computing means, the present position of the vehicle obtained by the present position computing means and the map data stored in the map data storage medium to display a map including the present position of the vehicle on the display.

To accomplish the third object of the invention, there is provided a map display system including: display means including a sub-display area for displaying a vehicle travel guidance map; a map data storage medium preliminarily storing map data including level information corresponding to a plurality of map reduced scales; and control means for displaying an enlarged map showing the neighborhood of the present position of the vehicle in accordance with the level information of the map data in the map data storage medium.

The present invention will be apparent from the following detailed description taken in conjunction with the accompanying drawings, in which:

FIGS. 5a and 5b are flow charts for explaining the processing operations according to the invention;

FIG. 21 is a flow chart showing the processing executed when the ignition switch is turned on;

FIG. 22 is a flow chart executed when the set key is turned on;

FIG. 24 is a flow chart showing the processing executed when the name search key is turned on;

FIG. 28 is a flow chart showing the municipalities name processing of the prefectural name processing;

FIG. 29 is a diagram showing a display pattern made on the CRT display when the municipalities name processing is performed;

FIG. 30 is a flow chart showing the spot name processing of the municipalities name processing;

FIG. 31 is a diagram showing a display pattern made on the CRT display when the spot name processing is performed;

FIG. 34 is a flow chart showing the processing performed when the map search key is turned on;

FIG. 35 is a flow chart showing the processing performed when the reservation key is turned on;

FIG. 37 is a flow chart showing the processing performed when the selection key is turned on;

FIG. 39 is a flow chart showing the processing performed when the auto key is turned on.

Figure 1:
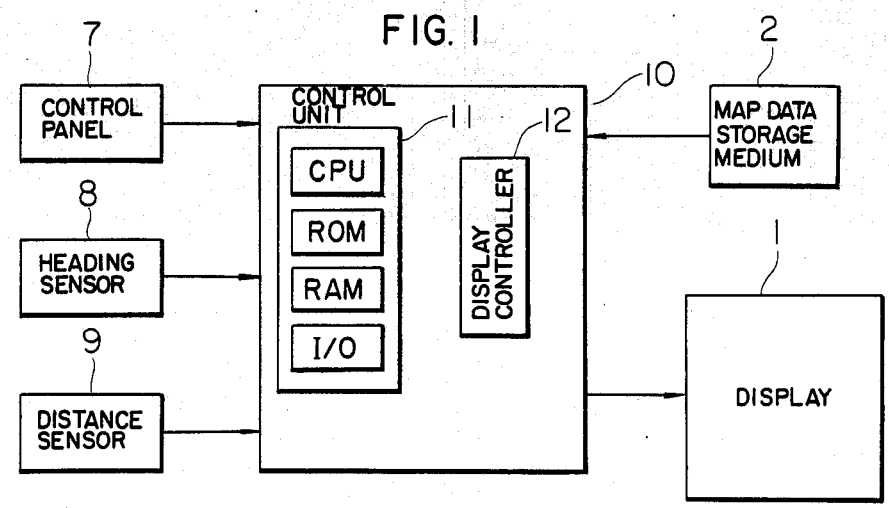
FIG. 1 is a block diagram showing a first embodiment of the invention.

A first embodiment of the invention will now be described with reference to FIGS. 1 to 8. FIG. 1 is a block diagram of the first embodiment of the invention. In the Figure, numeral 7 designates a control panel which functions as selection means and is operated by the driver or the like upon operating a travel guidance system. Numeral 8 designates a heading sensor for detecting the direction of movement of the vehicle or the direction of the earth's magnetic field with respect to the vehicle, 9 a distance sensor for detecting the distance traveled by the vehicle, 2 a map data storage medium preliminarily storing given map data, 10 a control unit comprising a microcomputer 11 including a CPU, an ROM, an RAM and an I/O device and a display controller 12 and functionally adapted to perform computational operations and display controls, and 1 a display adapted to display at least a map.

The control panel 7 includes an enlargement key for commanding the change of the map being displayed or the presently displayed map to a higher magnification, a reduction key for changing the presently displayed map to a lower reduced scale, a thin key for changing the presently displayed map to a lower density, and a dense key for changing the presently displayed map to a higher density.

The heading sensor 8 includes a ring-shaped permalloy core, an excitation coil and two coils arranged perpendicular to each other and it supplies to the control unit 10 a heading signal for detecting the direction of movement of the vehicle with respect to the earth's magnetic field in accordance with the output voltages of the two coils.

The distance senor 9 indirectly detects the rotation of the speedometer cable as an electric signal by a reed switch, a magnetic sensitive element or a photoelectric conversion element or detects the rotation of the output shaft of the transmission as an electric signal by the similar means as mentioned previously and supplies to the control unit 10 a distance signal which is used in the computation of the distance traveled by the vehicle.

Figure 2:
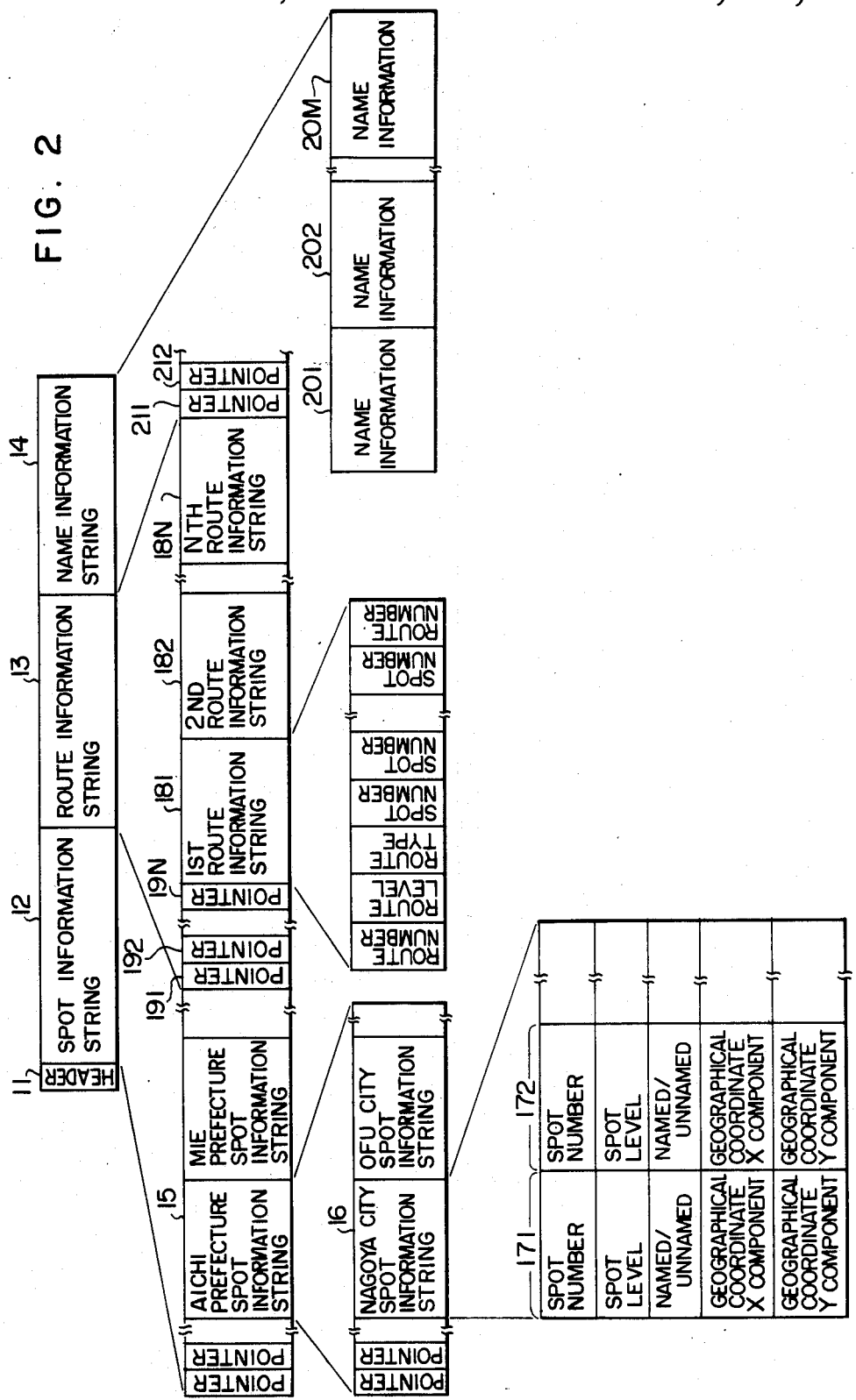
FIG. 2 is a diagram showing a map data structure according to the invention.
Figure 5B:
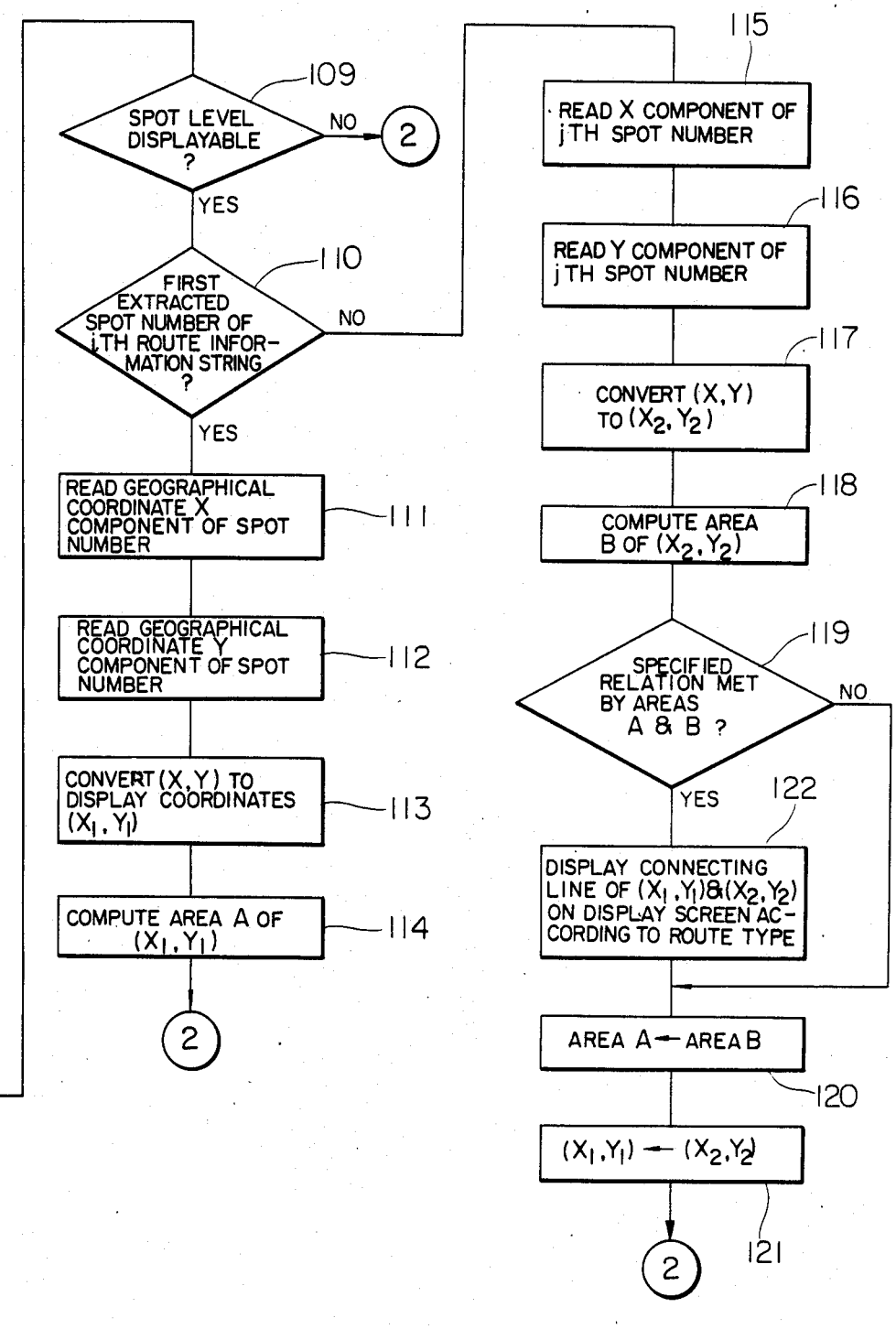

The map data storage medium 2 includes an ROM (read only memory) package. As shown in FIG. 2, for example, the data structure of the map data preliminarily stored in the map data storage medium 2 includes a header 11 serving as a regional map data identification symbol, a spot information string 12 relating to such spots as the major intersections, a route information string 13 relating to such routes as the national roads and a name information string 14 relating to the various services. The spot information string 12 includes a group of prefectural spot information strings for the prefectures belonging to the region concerned, such as, an Aichi Prefecture spot information string 15 relating to Aichi Prefecture and each of the prefectural spot information strings in the group, e.g., the Aichi Prefecture spot information string 15 includes a group of city spot information strings for the cities belonging to the prefecture concerned, such as, a Nagoya City spot information string 16. Each of the city spot information strings in the group, e.g., the Nagoya City spot information string 16 includes a spot information group including spot information 171, 172,—for the major spots belonging to Nagoya City and each of the spot information 171, 172,—includes such information as the spot number, spot level, spot named/unnamed and X and Y components of geographical coordinates of the spot concerned. The spot named/unnamed includes data indicative of presence or absence of a spot name and in the presence of the spot name a name address indicative of a name information having data for display of the spot name (for example, NAGOYA STATION). The route information string 13 includes 1st to N route information strings 181, 182,—, 18N and pointers 191, 192,—, 19N corresponding in one-to-one relation to the former and each of the spot information strings 181, 182,—, 18N includes the route number, route level, route classification, group of spot numbers for the spots constituting the route and route end. The name information string 14 includes a name information 201, a name information 202,—, a name information 20M. The pointer as shown in FIG. 2 includes a top address of respective information strings and a name address indicating the name information corresponding to the information string.

The route classification indicates the type of the route concerned, such as, the national road, expressway, ordinary road, railway or seaside, and the spot classification indicates the type of the spot in question, such as, the ordinary intersection, public highway grade separation, interchange, intersection of public highway and expressway or intersection of public highway and railway.

The control unit 10 receives the command signal from the control panel 7, the heading signal from the heading sensor 8, the distance signal from the distance sensor 9 and the map data from the map data storage medium 2 so that the required processing as will be described later with reference to FIG. 5 is executed and the desired display control is performed on the display 1 thereby supplying video signals to the display 1.

The display 1 uses a CRT (cathode ray tube) and it displays a map, etc., on the screen in accordance with the video signals from the control unit 10.

With the construction described above, the relationship between the level information of the map data in the map data storage medium 2 and the sizes selectable by the operation of the keys becomes as shown in the following Table I.

TABLE I

| Reduced scale | 1/1,000,000 | 1/500,000 | 1/200,000 | 1/100,000 | 1/50,000 | 1/25,000 |
|---|---|---|---|---|---|---|
| Size | 0 | 1 | 2 | 3 | 4 | 5 |
| Display enable level | 0 | 0,1 | 0,1,2 | 0,1,2,3 | 0,1,2 3,4 | 0,1,2, 3,4,5 |

More specifically, when the size 0 corresponding to the scale of 1/1,000,000 is selected by the operation of the enlargement key or the reduction key, only those routes and spots having the predetermined level information of 0 are enabled for display on the display 1. On the other hand, when the size 1 corresponding to the scale of 1/500,000 is selected, only those routes and spots having the level information of 0 or 1 are made displayable and the same is applicable to the relationship between the selection of the other sizes and the corresponding objects to be displayed.

While the relationship between the sizes and the levels usually becomes as indicated in the above Table I, when the thin key or the dense key is operated, the relationship between the two is updated as shown in the following Table II or III each time the thin key or the dense key is operated. The Table II corresponds to the relationship obtained when the thin key is operated once.

TABLE II

| Size | 0 | 1 | 2 | 3 | 4 | 5 |
|---|---|---|---|---|---|---|
| Display enable level | 0 | 0 | 0,1 | 0,1,2 | 0,1 2,3 | 0,1,2 3,4 |

TABLE III

| Size | 0 | 1 | 2 | 3 | 4 | 5 |
|---|---|---|---|---|---|---|
| Display enable level | 0,1 | 0,1,2 | 0,1 2,3 | 0,1,2 3,4 | 0,1,2 3,4,5 | 0,1,2 3,4,5 |

More specifically, with the map corresponding for example to the size 3 being displayed currently, if the thin key is operated once, instead of the spots and routes which have had any of the levels 0, 1, 2 and 3 and have therefore been made displayable, those routes and spots having any of the levels 0, 1 and 2 are made displayable and thus the routes and spots having the level 3 are excluded from the displayable ones thereby making the displayed map sparse. That is, the density of features displayed on the map is decreased. On the other hand, with the map having the selected size 3 being displayed, if the dense key is operated once, the spots and routes having the level 4 are additionally made displayable and the displayed map is made dense. That is the density of features displayed on the map is increased.

Next, changes of the display pattern on the display 1 will be explained by way of examples with reference to FIGS. 3a to 3c and FIGS. 4a to 4c.

Figure 3A:
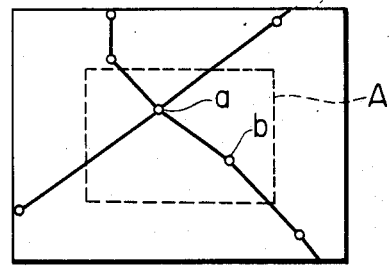
FIGS. 3a to 3c are diagrams showing display patterns used in the case where a display mode is a reduction mode.
Figure 3B:
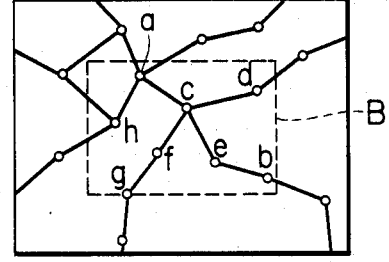
Figure 3C:
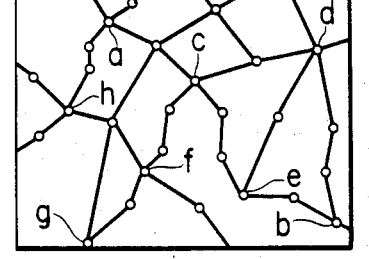

When the enlargement of the displayed map is commanded by a key operation of the operator or as a result of the internal processing of the control unit 10, assuming for example that the displayed map is as shown in FIG. 3a, the control unit 10 performs an enlarging process on an area A enclosed by the broken line in FIG. 3a and thus the map on the screen of the display 1 is changed to a relatively detailed one as shown in FIG. 3b. Then, if a further enlargement is commanded, the enlarging process is now performed on an area B enclosed by the broken line in FIG. 3b and therefore a more detailed map is displayed on the screen of the display 1 as shown in FIG. 3c. Note that points a and b of FIG. 3a indicate the same spots as points a and b in FIG. 3b and the points a to h of FIG. 3b represent the same spots as points a to h in FIG. 3c.

On the other hand, when commands are given to reduce the displayed map, changes take place which are reverse to those occurring in the display pattern as the result of the above-mentioned enlarging processing. In other words, the displayed map shown in FIG. 3c is changed to the displayed map of FIG. 3b and then to the displayed map of FIG. 3a.

Figure 4A:
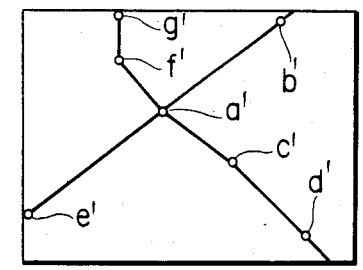
FIGS. 4a to 4c are diagrams showing another display patterns used in the case where the display mode is a dense mode.
Figure 4B:
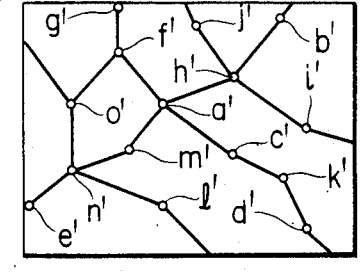
Figure 4C:
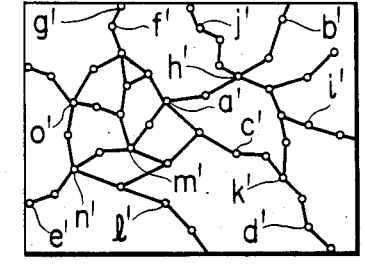

Also, when a command for making the displayed map dense is generated by a key operation of the operator or as a result of the internal processing of the control unit 10, assuming for example that the map displayed presently is as shown in FIG. 4a, then the control unit 10 performs a densifying process and thus a relatively detailed map as shown in FIG. 4b, for example, is displayed on the screen of the display 1. Then, if a further densification is commanded, a further densifying process is performed and therefor a more detailed map is displayed as shown in FIG. 4c, for example. Note that points a' to g' of FIG. 4a show the same spots as points a' to g' in FIG. 4b and the points a' to o' of FIG. 4b represent the same spots as points a' to o' in FIG. 4c.

On the other hand, if commands are generated to thin out the displayed map, changes take place which are reverse to the changes made in the display pattern by the above-mentioned densifying process. In other words, the displayed map shown in FIG. 4c is changed to the displayed map of FIG. 4b and then to the displayed map of FIG. 4a.

The processing operations of the first embodiment of the invention will now be described with reference to the simplified flow chart shown in FIG. 5. The following description will be made with reference to a case where enlarging commands are generated by the key operations of the operator.

When the operator operates the enlarging key on the control panel 7, the microcomputer 11 of the control unit 10 starts the execution of such a processing as shown in FIG. 5.

A step 101 is performed first to read the content of the leading pointer 191 of the route information string 13 in the map data storage medium 2.

Then, a step 102 is performed to determine whether the contents of all the pointers have been read out.

Since this occurs just after the reading of the content of the leading pointer 191, the decision results in NO and then a step 103 is performed.

At the step 103, the route level information of the ith route information string (the first route information string 181) designated by the ith pointer (the leading pointer 191 at this time) is read out. Here, the route level information may be considered as a relative importance assigned to each route.

Then, a step 104 is performed to determine whether the route level is a display enable one, that is, whether the ith route (the first route) has an importance which makes it displayable with respect to the size selected in the above-mentioned manner.

If the ith route (the first route) is one which needs not be displayed, a step 105 is performed so that the pointer is updated, that is, the content of the next pointer (the second pointer 192) is read out and a return is made to the step 102.

On the other hand, if the ith route (the first route) is to be displayed, then a step 106 is performed thus reading the route type information of the ith route information string (the first route information string 181).

Then, a step 107 is performed so that the spot number information (the leading spot number information at this time) of the ith route information string (the first route information string 181) is read out.

Then, a step 108 is performed to determine whether the end of route information of the ith route information string (the first route information string 181) has been read out.

Since this happens just after the reading of the leading spot number information, the decision results in NO and a step 109 is performed. Thus, the spot level information assigned to that spot number of the spot information string 12 corresponding to the spot number concerned (the leading spot number) is read out and a decision is made as to whether the spot number concerned has an importance which makes it displayable with respect to the size selected in the above-mentioned way.

If this spot is one which needs not be displayed, a return is made to the step 107 so that the next spot number of the ith route information string (the first route information string 181) is read out.

On the other hand, if the spot is to be displayed, a step 110 is performed to determine whether the spot is of the spot number extracted for the first time for the ith route information string (the first route information string 181).

Since this is the first spot number at this time, the decision results in YES and then steps 111 to 114 are performed. Thus, the geographical coordinate X and Y components of the spot are read out so that the geographical coordinates (X,Y) are converted to display coordinates $(X_1,Y_1)$ and then an area A to which the display coordinates $(X_1,Y_1)$ belong is determined.

Figure 6A:
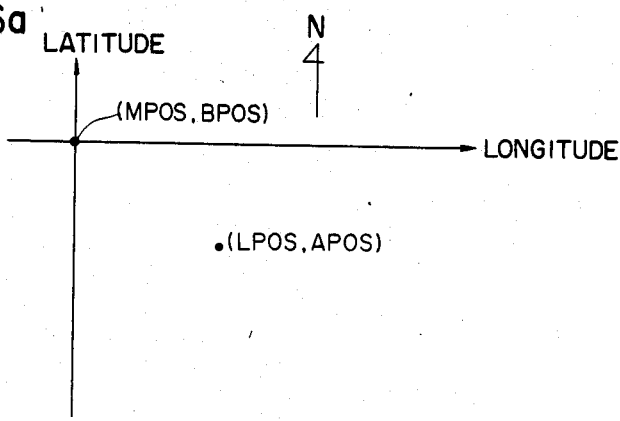
FIGS. 6a and 6b are diagrams for explaining the coordinate conversion from a geographical coordinate system to a display coordinate system.
Figure 6B:
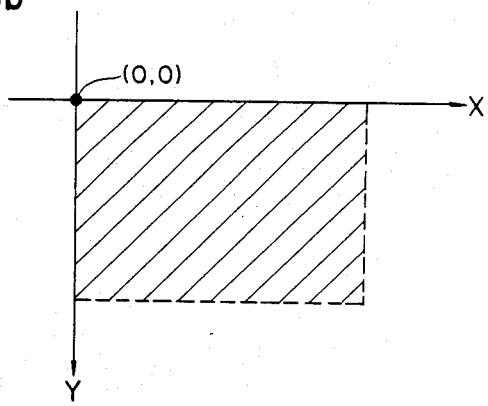

This coordinate conversion processing is such that, as shown in FIG. 6a showing the geographical coordinate system and FIG. 6b showing the display coordinate system, (1) the point (MPOS, BPOS) is obtained which corresponds to the geographical coordinates of the geographical coordinate system having one-to-one correspondence to the origin (0,0) of the hatched area of the display coordinate system (corresponding to the map display area of the display 1), and then (2) in accordance with the obtained point (MPOS, BPOS) the geographical coordinates (LPOS, APOS), that is, (X,Y) of the spot in question are converted to the corresponding spot $(X_1,Y_1)$ of the display coordinate system.

In this case, the spot (MPOS, BPOS) is obtained in the following way. Firstly, the present position or the center point of an administrative division spot group in the case of an administrative division selection, is determined as the displayed map center coordinates (MAPCENX, MAPCENY) of the geographical coordinate system and then the point (MPOS, BPOS) is obtained from the following equations using as parameters the coordinate information mapcenx MAPCENY, the numbers of dots a and b of the map display screen of the display 1 (FIG. 8) and the number of dots LDOT per unit longitude (corresponding to the horizontal direction in FIG. 8) after "longitude"; and the number of dots ADOT per unit latitude (corresponding to the vertical direction in FIG. 8) which are determined in accordance with the selected size MPOS=MAPCENX−b/LDOT
BPOS=MAPCENY+a/ADOT Then, the point $(X_1,Y_1)$ is determined by the following equations $$X_1 = (LPOS - MPOS) \times LDOT$$

$$Y_1 = (BPOS - APOS) \times ADOT$$

The coordinate of the present position is referred as (MAPCENX, MAPCENY).

Figure 7A:
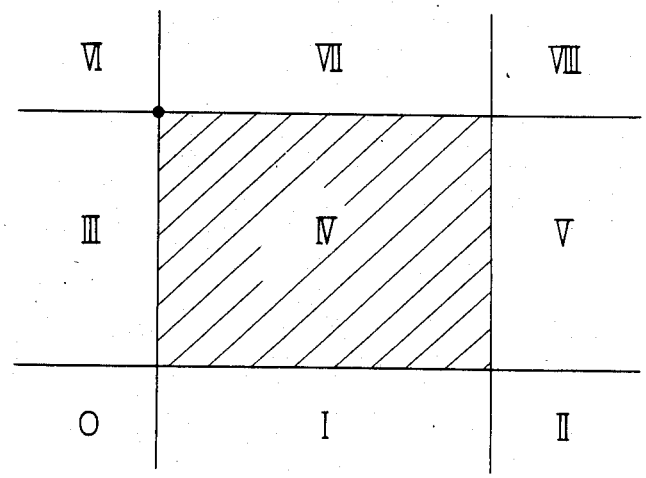
FIGS. 7a and 7b are diagrams for explaining the connection conditions between the points on the display coordinate system.

On the other hand, the above-mentioned area determination processing is performed by determining that the display coordinate point $(X_1,Y_1)$ obtained by the previously mentioned coordinate conversion process belongs to one of the areas 0 to VIII divided as shown in FIG. 7a. In the case of FIG. 7a, the area IV corresponds to the hatched area shown in FIG. 6b of the map display area. That is, the display coordinate point $(X_1, Y_1)$ is determined to belong to one of the areas O to VIII shown in FIG. 7a by comparison of coordinates and the determined area is named the area A (as well as the area B described later).

When the area A to which the display coordinate point $(X_1,Y_1)$ belongs is obtained at the step 114, a return is made to the step 107 and the next spot number of the ith route information string (the first route information 181) is read out.

Then, the step 108 is performed to determine whether the route is ended. If it is not, then the step 109 is performed to determine whether the spot level of this spot number is a display enable level. If it is not, then a return is made to the step 107. If it is the display enable level, then the step 110 is performed to determine whether this spot number is the one extracted for the first time for the ith route information string (the first route information string 181).

Since the first spot number has already been extracted by this time, the decision results in NO and then steps 115 to 118 are performed in this order thereby performing the similar process as the steps 111 to 114. In other words, the geographical coordinates $(X,Y)$ of this spot number (the jth spot number) are converted to the corresponding display coordinates $(X_2,Y_2)$ and an area B to which the display coordinates $(X_2,Y_2)$ belong is determined.

Figures 7B, 8:
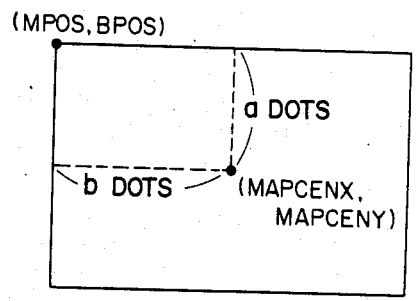
FIG. 8 is diagram for explaining the method of obtaining the geographical coordinates (MPOS, BPOS) corresponding to the origin (0,0) on a map display screen.

Then, a step 119 is performed to make a decision as to whether the connection between the point $(X_1,Y_1)$ and the point $(X_2,Y_2)$ is to be displayed, that is, whether there is a specified relation between the areas A and B. As will be seen from FIGS. 7a and 7b, if, for example, the display coordinates $(X_1,Y_1)$ belong to the area 0 and the other display coordinates $(X_2,Y_2)$ belong to any one of the areas 0, I, II, III and VI, the decision process determines that there is no specified relation (this is indicated by a mark X in FIG. 7b). If the display coordinates $(X_1,Y_1)$ belong to the area 0 and the other display coordinates $(X_2,Y_2)$ belong to any one of the areas IV, V, VII and VIII, then it is determined that there is the specified relation (this is indicated by a mark O in FIG. 7b). The decisions on the other combinations become as shown in FIG. 7b.

If there is no specified relation between the areas A and B, then steps 120 and 121 are performed so that an area updating process of changing the area A to the area B and a coordinate updating process of changing the coordinates $(X_1,Y_1)$ to the coordinates $(X_2,Y_2)$ are performed and a return is made to the step 107.

On the other hand, if there is the specified relation, then a step 122 is performed so that the line connecting the point $(X_1,Y_1)$ and the point $(X_2,Y_2)$ is displayed on the display screen in accordance with the type of the route. In other words, if the ith route (the first route) is a national road, the route is displayed with an increased brightness as compared with the other routes. Then, the steps 120 and 121 are performed to effect the area updating process and the coordinate updating process and a return is made to the step 107.

Thereafter, so long as the end of route is not read out, the route including the steps 107, 108 and 109 and the route including the steps 107, 108, 109, 110 and 115 to 122 (the step 122 is omitted as occasion demands) are selectively performed thus making the required route displays for the ith route (the first route).

When the end of route is read out for the ith route (the first route) so that the decision of the step 108 changes to YES, the step 105 is performed and the pointer updating processing is performed. Thus, the processing for the next route (the second route) is performed in the like manner as in the case of the first route.

Thereafter, the same processing as mentioned above is successively performed for each of the route information strings so that when the processing of the Nth information string 18N is completed, it is determined at the step 102 that the contents of all the pointers have been read out and the processing shown in FIG. 5 is ended.

From the foregoing description it will be seen that when the control unit 10 receives enlargement commands from selecting means, e.g., the control panel 7, those spots having the corresponding levels to the commands are extracted from the routes of the route information strings in the map data storage medium 2 which have those levels corresponding to the commands and the extracted spots are subjected to the coordinate conversion thus determining the presence of a specified relation between the adjacent spots and thereby displaying the connection between the spots having the specified relation with a brightness corresponding to the type of the route.

As a result, such patterns as shown in FIGS. 3a to 3c will be obtained when the display mode is the reduction mode for enlargement or size reduction purposes and such display patterns as shown in FIGS. 4a to 4c will be obtained when the display mode is the thin or dense mode.

As described hereinabove, in accordance with the present invention the spot information of the map data are provided with geographical coordinates and also the spot numbers are each provided with at least a level, with the result that the selection of any desired display mode by the operator results in the display on the display of the maps which have the levels corresponding to the selected display mode thus making it possible to ensure a satisfactory freedom for the display patterns even if the data capacity is relatively small.

Note that the display is not limited to a CRT and it may be any other display device such as a liquid crystal display or EL display. Also, while the map data storage medium includes an ROM, it may be a magnetic tape, magnetic disk, magnetic bubbles or the like. In this case, it is needless to say that a reader must be used to read the map data. Further, while the heading sensor is of the type which detects the earth's magnetic field, it is possible to use a heading sensor of the gyro type which detects the relative direction of movement of a vehicle.

Further, while, in the above-described embodiment, the geographical coordinates are given in terms of the absolute longitude and latitude, the present invention embraces cases where the coordinates of each spot are given in terms of the spherical coordinates with respect to a specified spot (e.g., Tokyo) or in terms of the rectangular coordinates with respect to the specified spot.

Figure 9:
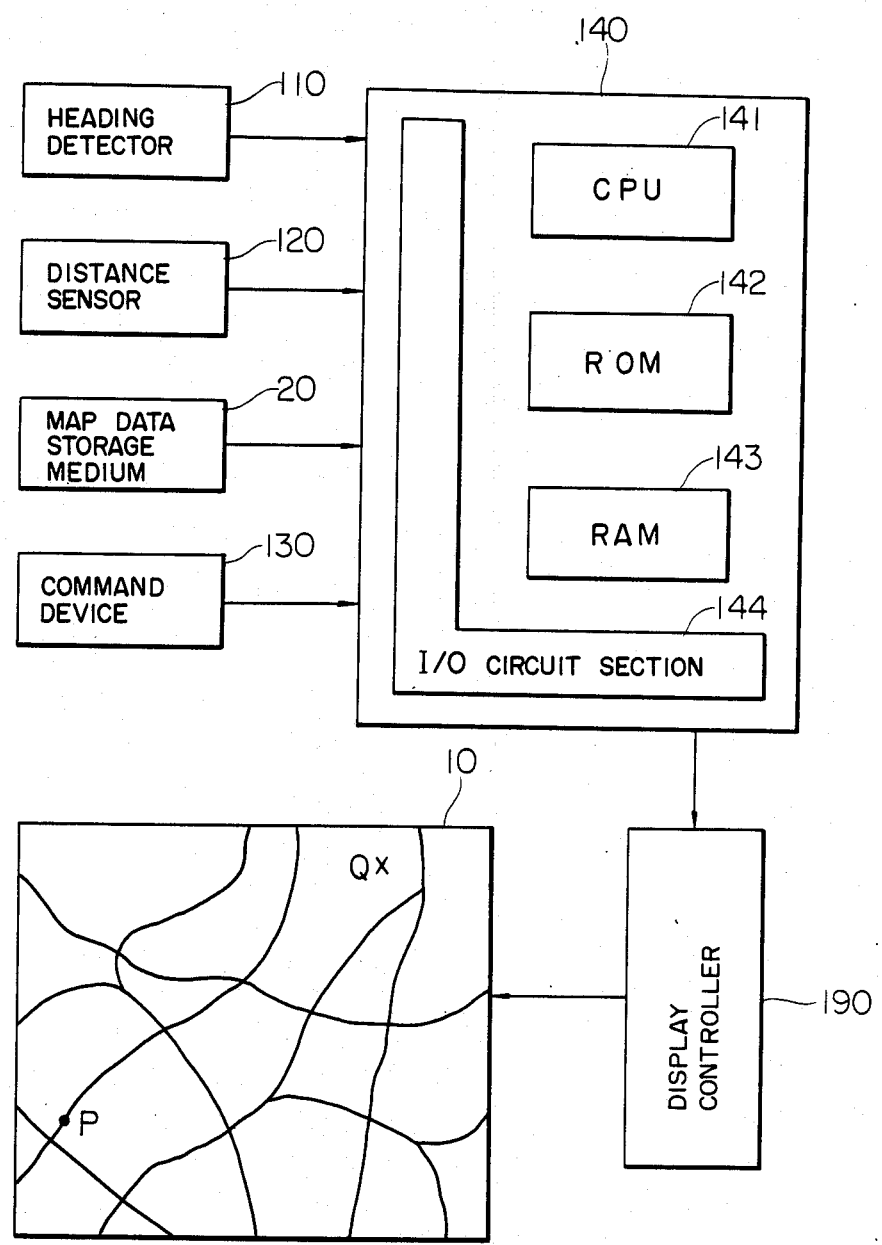
FIG. 9 is a block diagram showing the simplified construction of a second embodiment of the invention.

A second embodiment of the invention will now be described with reference to FIGS. 9 to 17. FIG. 9 is a block diagram showing the overall construction of the second embodiment of the invention. In the Figure, numeral 110 designates a heading detector for detecting the direction of movement of a vehicle, 120 a distance sensor for detecting the distance traveled by the vehicle, 130 a command device operable by the operator to set the present position and destination of the vehicle, 140 an electronic control circuit including a CPU 141, an ROM 142, an RAM 143 and an I/0 circuit section, and 190 a display controller for receiving the signals from the electronic control circuit 140 to display a map on a display 10.

The heading detector 110 includes a heading sensor having a ring-shaped permalloy core, an excitation coil and a pair of coils arranged perpendicular to each other to detect the X and Y components of the earth's magnetic field corresponding to the direction of movement of a vehicle in accordance with the output voltages of the coils and A-D converters for converting the analog signals detected by the heading sensor to digital signals thereby generating digital signals indicative of the X and Y components of the earth's magnetic field corresponding to the direction of movement of the vehicle.

The distance sensor 120 indirectly detects the rotation of the speedometer cable or the rotation of the output shaft of the transmission by a reed switch, magnetic sensitive element or photoelectric conversion element to generate a pulse signal for each unit distance traveled by the vehicle.

A map data storage medium 20 includes an ROM (read only memory) package. The data structure of the map data preliminarily stored in the map data storage medium 20 is the same with that shown in FIG. 2.

The electronic control circuit 140 receives the map data from the map data storage medium 20, the heading signal from the heading detector 110, the distance signal from the distance signal from the distance sensor 120 and the command signal from the command device 130 to execute a processing which will be described later and thereby supply control signals to the display controller 190.

The display controller 190 is responsive to the control signals from the electronic control circuit 140 to perform display controls for the display 10 and supply video signals to the display 10.

The display 10 includes for example a cathode ray tube, liquid crystal display or LED display and it is responsive to the video signals from the display controller 190 to display a road map, a vehicle's present position P and a destination Q as shown in the Figure.

Next, an example of the operating procedure of the command device 130 for setting the present position and destination of a vehicle will be described with reference to FIGS. 10 and 11.

Figure 10:
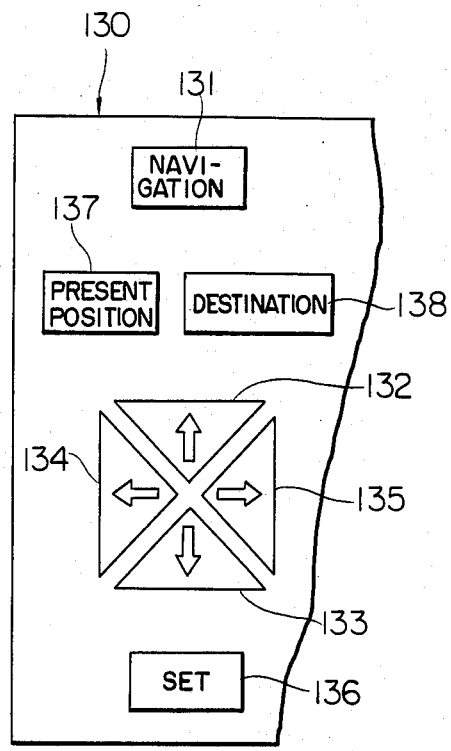
FIG. 10 is a diagram showing the arrangement of principal keys in the command device of FIG. 10.

After the ignition switch has been turned on, a navigation key 131 shown in FIG. 10 is depressed thus displaying a given number of prefectural names on the display 10. While looking at the list of the prefectural names on the screen of the display 10, the vehicle occupant depresses a cursor key 132 or 133 so as to display within a specified area of the screen the name of the prefecture to which the present position of the vehicle belongs, e.g., Aichi Prefecture.

Then, a cursor key 134 is depressed so that the names of a plurality of cities belonging to Aichi Prefecture are displayed on the screen of the display 10. While looking at the names of the cities, the occupant depresses the cursor key 132 or 133 so that the name of the city to which the present position of the vehicle belongs, e.g., the name of Kariya City is displayed within the specified screen area.

Then, the cursor 134 is depressed so that the names of a plurality of towns or the like belonging to Kariya City are displayed on the screen of the display 10. While looking at the names of the towns, the occupant depresses the cursor key 132 or 133 so that the name of the town to which the vehicle's present position belongs, e.g., the name of Showa Town is displayed within the specified screen area. Then, a set key 136 is depressed so that the map of the whole Showa Town is displayed on the screen of the display 10. The map search as mentioned above is realized by the process shown in FIGS. 26 to 33.

By operating the command device 130 in this way, the map covering the present position of the vehicle is displayed on the screen of the display 10.

Then, after a present position key 137 has been operated, while looking at the displayed map, one of the cursor keys 132 to 135 is operated and thus a present position mark P is set or arranged on the map.

The destination is set in the like manner as the setting of the present position of the vehicle, that is, a map to which the destination belongs is first displayed on the screen of the display 10 and then after the operation of a destination key 138 one of the cursor keys 132 to 135 is operated thus setting a destination mark Q on the displayed map. In the setting of the destination, the coordinate of a position of the cursor is memorized after the cursor is moved to the destination when the set key is turned on.

Note that the map for setting the present position or destination of a vehicle needs not be a townbased map as mentioned previously and it may be a city or prefectural map. In other words, the map may be one on which the driver or the like desires to set the present position or destination of a vehicle. Also, contrary to the operation of the cursors 135 and 134, the spot names displayed on the display may be changed to the greater divisions, e.g., from the town names to the city names and from the city names to the prefectural names.

Figure 11:
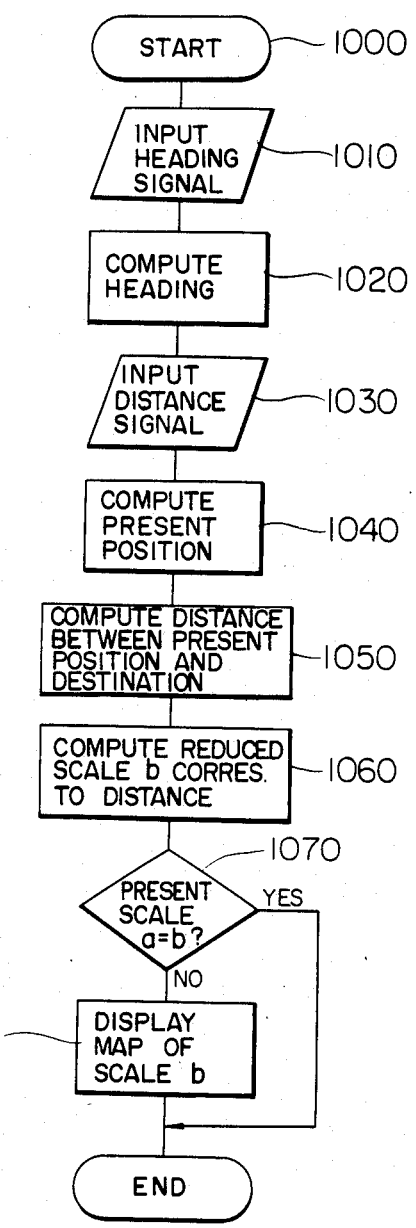
FIG. 11 is a flow chart showing a control program for the second embodiment.

The processing of the second embodiment will now be described with reference to the flow chart of FIG. 11 showing a control program. The control program of FIG. 11 shows a routine 1000 which is started after the ignition switch has been turned on and the present position and destination of a vehicle have been set by the operation of the command device 130 as mentioned previously and the routine is executed at intervals of a predetermined period (e.g., at intervals of 100 ms).

When the processing of the routine 1000 is started, the heading signal from the heading detector 110 is read first at a step 1010 and then the heading of the vehicle with respect to the earth's magnetic field is computed at the next step 1020.

Then, the distance signal from the distance sensor 120 is detected at a step 1030 and the next step 1040 computes the present position of the vehicle from the vehicle heading computed at the step 1020 and the distance signal detected at the step 1030.

In other words, the present position of the vehicle is determined by computing the distance traveled from the vehicle's present position (starting position) set prior to the starting of the processing of the routine 1000 and the heading of the vehicle.

At the next step 1050, the separating distance between the destination already set prior to the starting of the processing of the routine and the present position of the vehicle determined at the step 1040 is computed. In the step 1050, the distance between the destination and the present position is calculated depending on the coordinates of the destination and the present position.

Then, the processing transfers to a step 1060 so that a reduced scale b of a map to be displayed on the display 10 is determined in accordance with the separating distance obtained at the step 1050.

The next step 1070 determines whether the reduced scale b determined at the step 1060 is equal to the reduced scale a of the map actually displayed on the display 10. If the decision results in NO, a transfer is made to the next step 1080 where a map on the reduced scale b is displayed on the display 10 thereby ending the execution of the routine 1000.

On the contrary, if the step 1070 determines that the reduced scale a of the actually displayed map is equal to the reduced scale b obtained at the step 1060, the execution of the routine 1000 is ended at this state and the map reduced to the scale a and presently displayed on the display 10 is displayed continuously.

The process effected to obtain the desired reduced scale according to the separating distance between the present position of the vehicle and the destination at the step 1060 of the routine 1000 will now be described in a greater detail with reference to FIG. 12.

Figure 12:
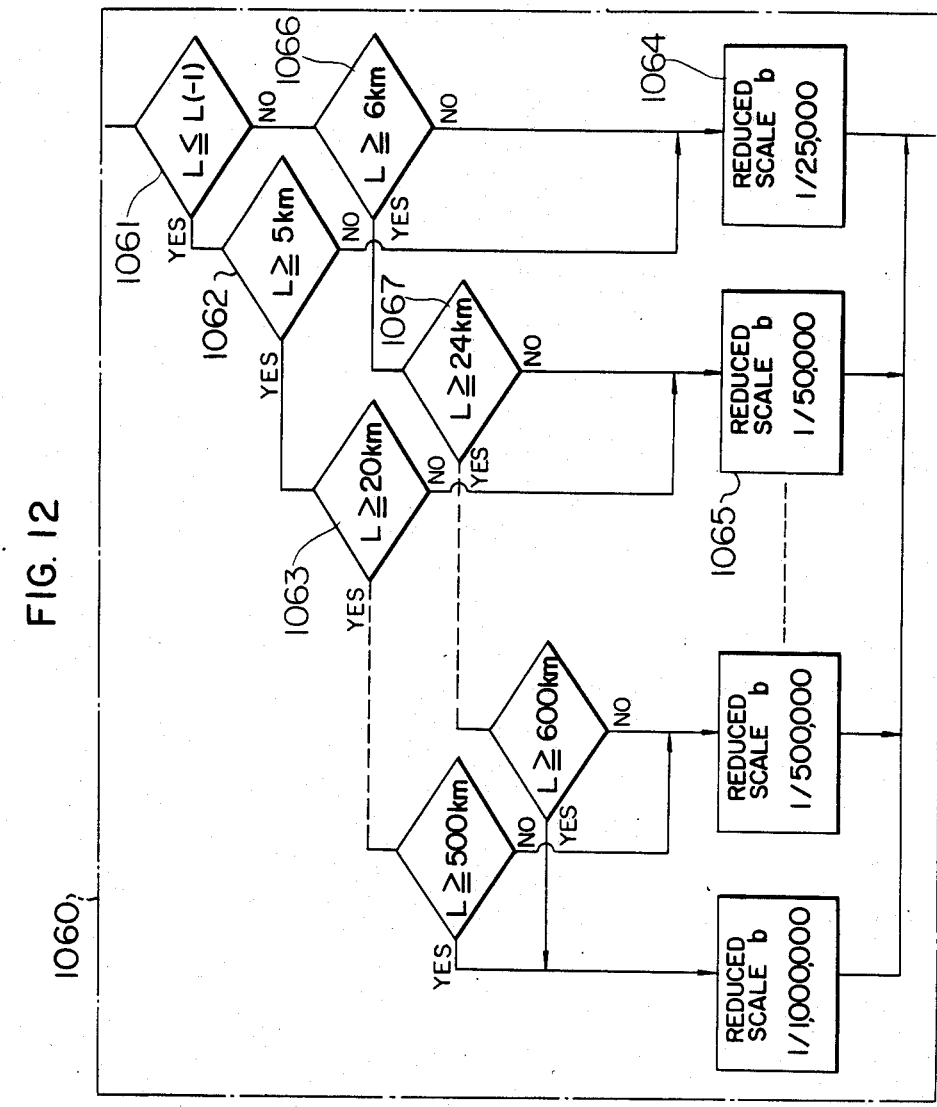
FIG. 12 is a flow chart showing the processing of the step 1060 in FIG. 11.

The flow chart shown in FIG. 12 is a control program showing detailed operations performed at the step 1060, and firstly a step 1061 determines whether the separating distance L obtained at the step 1050 of FIG. 11 is less than the separating distance $L(-1)$ obtained previously (100 msec before), that is, whether the vehicle is moving toward the destination.

Continuing the description on the assumption that the vehicle is moving toward the destination, the step 1061 determines that the separating distance L is less than the previously computed separating distance $L(-1)$ and the next step 1062 determines whether the separating distance L is 5 Km or over.

If the step 1062 determines that the separating distance L is 5 Km or over, a transfer is made to a step 1063 thus determining whether the separating distance L is 20 Km or over.

On the contrary, if the step 1062 determines that the separating distance L is less than 5 Km, then the reduced scale b of the map is set to 1/25,000 and a transfer is made to the process of the step 1070 shown in FIG. 11.

If the step 1063 determines that the separating distance L is 20 Km or over, whether the separating distance L is 50 Km or over is determined at a step which is not shown. If the step 1063 determines that the separating distance L is less than 20 Km, then the map scale b is set to 1/50,000 at a step 1065 and a transfer is made to the process of the step 1070 shown in FIG. 11.

In this way, where the vehicle is moving toward the destination, the step 1060 of FIG. 11 determines the proper reduced scale b corresponding to the separating distance L as shown in the following Table 1: for example, the reduced scale b is set to 1/25,000 when the separating distance L is not less than 0 Km and not greater than 5 Km and it is set to 1/50,000 when the separating distance L is not less than 5 Km and not greater than 20 Km.

TABLE 1

| Separating distance L (Km) | From 0 to below 5 | From 5 to below 20 | From 20 to below 50 | From 50 to below 200 | From 200 to below 500 | 500 or over |
|---|---|---|---|---|---|---|
| Reduced scale b | 1/25,000 | 1/50,000 | 1/100,000 | 1/200,000 | 1/500,000 | 1/1,000,000 |

Referring to the case where the vehicle is moving away from the destination, the step 1061 determines that the separating distance L is greater than the previously computed separating distance $L(-1)$ and a step 1066 determine whether the separating distance L is 6 Km or over.

If the step 1066 determines that the separating distance L is under 6 Km, the map scale b is set to 1/25,000 at the step 1064. If the step 1066 determines that the separating distance L is 6 Km or over, a step 1067 determines whether the separating distance L is 24 Km or over.

If the step 1067 determines that the separating distance L is under 24 Km, the map scale b is set to 1/50,000 at a step 1067. If the step 1067 determines that the separating distance L is 24 Km or over, whether the separating distance L is 60 Km or over is determined at a step which is not shown.

In this way, where the vehicle is moving away from the destination, the step 1060 of FIG. 11 determines the reduced scale b in accordance with the separating distance L as shown in the following Table 2: for example, the reduced scale b is set to 1/25,000 when the separating distance L is from 0 to 6 Km and it is set to 1/50,000 when the separating distance L is from 6 to 24 Km.

TABLE 2

| Separating distance L (Km) | From 0 to below 6 | From 6 to below 24 | From 24 to below 60 | From 60 to below 240 | From 240 to below 600 | 600 or over |
|---|---|---|---|---|---|---|
| Reduced scale b | 1/25,000 | 1/50,000 | 1/100,000 | 1/200,000 | 1/500,000 | 1/1,000,000 |

As described above, a range of the separating distances L with respect to the map scales b has been predetermined as shown in Table 1 for the case where the vehicle is moving toward the destination, and another range of the separating distances L with respect to the map scales b has been predetermined as shown in Table 2 for the case where the vehicle is moving away from the destination. This means that when the vehicle is moving toward the destination, the map is enlarged as the separating distance L becomes less than any one of the lower limit values (hereinafter referred to as enlarging preset values) in the predetermined range shown in Table 1, whereas when the vehicle is moving away from the destination, the map is reduced as the separating distance L becomes greater than any one of the upper limit values (hereinafter referred to as reducing preset values) in the predetermined range shown in Table 2.

In this connection, the reason for predetermining the enlarging preset values and the reducing preset value to differ in value as will be seen from the above Tables 1 and 2 is that if the enlarging preset values and the reducing preset values are preset to the same values, when the vehicle is driving on a road where the separating distance L tends to attain a value close to one of the preset values, the map is enlarged or reduced each time the vehicle approaches the destination so that the separating distance L becomes less than the preset value or the vehicle moves away from the destination so that the separating distance L exceeds the preset value thus making the displayed map extremely hard to see for the driver, etc.

Also, the level information of the map data in the map data storage medium 20 have been predetermined in correspondence to the map scales b as shown in the following Table 3 so that as for example, the level information 0 corresponds to the reduced scale of 1/1,000,000 and the level information 0 and 1 correspond to the reduced scale of 1/500,000. This means that the extent of detailedness has been predetermined for each map to be displayed on the display 10 such that only the spots and routes having the level 0 are displayed when the scale of the displayed map is 1/1,000,000 and the spots and routes of the level 0 as well as the spots and routes of the level 1 are displayed when the scale of the displayed map is 1/500,000.

TABLE 3

| Reduced scale b | 1/25,000 | 1/50,000 | 1/100,000 | 1/200,000 | 1/500,000 | 1/1,000,000 |
|---|---|---|---|---|---|---|
| Level information | 0,1,2 3,4,5 | 0,1,2 3,4 | 0,1,2,3 | 0,1,2 | 0,1 | 0 |

Figure 13:
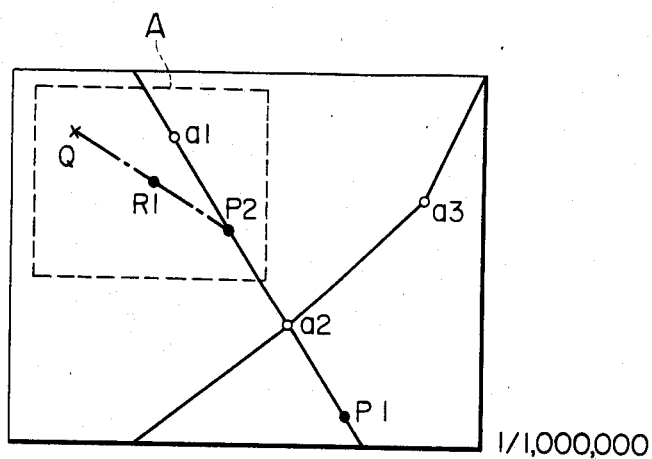
FIGS. 13 to 15 are diagrams showing display patterns displayed on the display in accordance with the second embodiment.
Figure 14:
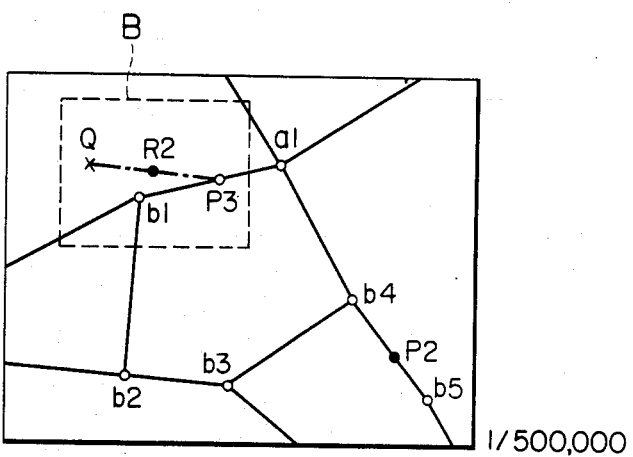
Figure 15:
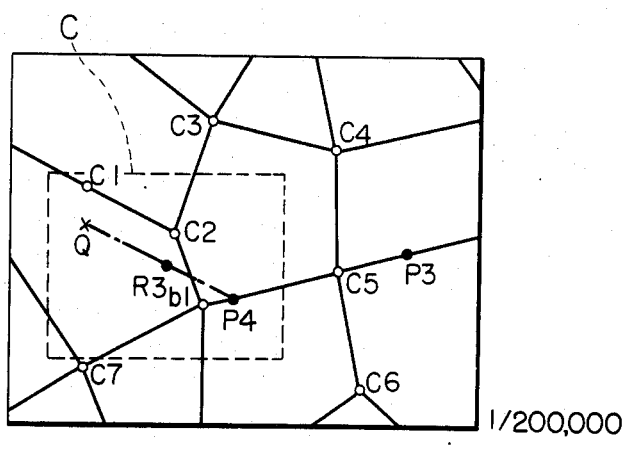

Thus, the maps displayed on the display 10 become as shown in FIGS. 13 to 15 in accordance with the level information corresponding to the map scales.

FIG. 13 shows the picture on the display 10 showing the map on a scale of 1/1,000,000 and spots $a_1$ to $a_3$ and routes of the level 0 are displayed. Also, a spot Q represents the destination and a spot $P_1$ represents the present position of the vehicle.

When the vehicle moves from the spot $P_1$ to a spot $P_2$ in the direction of the destination so that the separating distance between the spot $P_2$ and the destination Q becomes below 500 Km, the picture on the display 10 is changed to one as shown in FIG. 14 since the map scale is 1/500,000 and the level information are 0 and 1 when 200 Km$\leq$L$<$500 Km as mentioned previously.

The picture of FIG. 14 shows in enlarged form the portion A of FIG. 13 centering a middle point $R_1$ between the spot $P_2$ and the destination Q. Also, the spot $a_1$ represents a spot of the level 0 and spots $b_1$ to $b_5$ represent spots of the level 1. Of course, the displayed routes have the route information of the levels 0 and 1.

Then, when the vehicle moves from the spot $P_2$ to a spot $P_3$ so that the separating distance L becomes below 200 Km, in the like manner the picture on the display 10 is changed to one as shown in FIG. 15 since the map scale is 1/200,000 and the level information are 0, 1 and 2 when 50 Km$\leq$L$<$200 Km. Also, in this case the portion B of FIG. 15 centering a middle point $R_2$ between the spot $P_3$ and the destination Q is similarly displayed in enlarged form.

In this way, the map displayed on the display 10 is enlarged to show greater details as the vehicle comes nearer to the destination.

The process performed at the step 1080 of FIG. 11 to display the map of the reduced scale b or the process of displaying the map of the reduced scale corresponding to the separating distance is the same with the control program shown in FIG. 5.

Thus, in accordance with the control programs of the second embodiment shown in FIGS. 11 and 12, when the driver or the like operates the command device so that the present position of a vehicle serving as a starting point and a destination are preset thus starting the processing, the present position of the vehicle changing in response to the movement of the vehicle is computed in accordance with the signals from the heading detector 110 and the distance sensor 120 and one of the plurality of predetermined map scales b is selected in accordance with the separating distance between the computed present position of the vehicle and the destination. If the selected scale b is different from the scale a of the map actually displayed on the display presently, the process of replacing the displayed map on the display 10 with one having the reduced scale b is performed. The maps of the selected scales b are displayed by selecting the proper routes of the preset levels corresponding to the selected scales b from the route information strings stored in the map data storage medium 20, extracting the spots of the preset levels from the routes, performing the coordinate conversion on the extracted spots and displaying the connections between the adjacent spots having a specified relation with a brightness corresponding to the route type.

Also, the method of selecting the proper spot names or spot numbers may be used as the command method for establishing the present position and destination of a vehicle.

Further, while, in the above-described embodiment, the middle point between the present position and destination of a vehicle is used as the center of the map displayed on the display to change the displayed map, any point on the line connecting the present position and destination of the vehicle or the present position of the vehicle may be used as the center of the map. In this case, it is possible to arrange so that a map not including the destination is displayed when the present position of the vehicle is far apart from the destination thus necessitating the display of a map of a relatively wide extent and a map including the destination is displayed when the vehicle comes nearer to the destination thus changing the reduced scale to 1/50,000, for example.

Next, a description will be made of maps displayed on the display in a case where the present position of a vehicle is used as the center of a displayed map and a map not including the destination is displayed until the vehicle comes near to the destination with reference to FIGS. 16 and 17.

Figure 16:
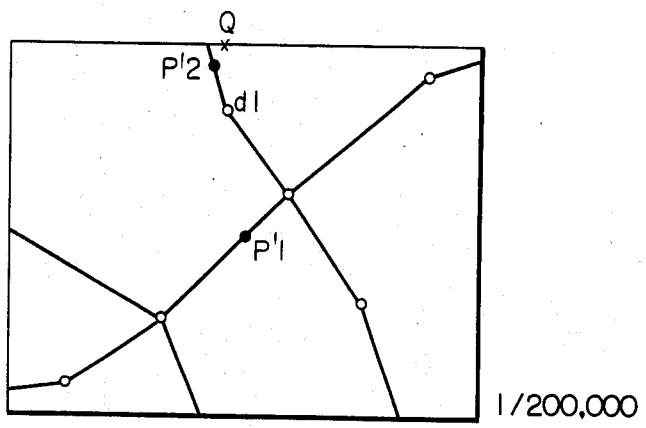
FIGS. 16 and 17 are diagrams showing other display patterns displayed on the display in accordance with the second embodiment.
Figure 17:
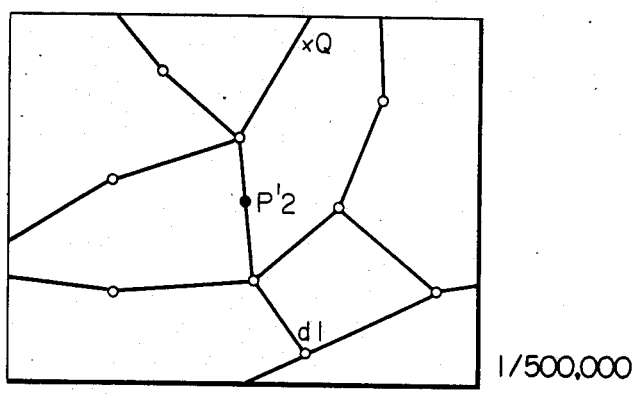

FIG. 16 shows a map which is on a reduced scale of 1/200,000 in correspondence to the separating distance L and not including the destination. In the Figure, symbol $P_1'$ designates the present position of the vehicle and symbol Q designates the destination. Since the destination Q is not included in the map displayed, the destination Q is displayed at one end of the display screen thus indicating the direction of the destination. When the vehicle moves to a position $P_2'$ in the direction of the destination so that a map on a scale of 1/50,000 is displayed, the map becomes as shown in FIG. 17 and the displayed map includes the destination Q. In this case, the same effect as the previously mentioned embodiment is also obtained.

A third embodiment of the invention will now be described with reference to FIGS. 18 to 40.

Figure 18:
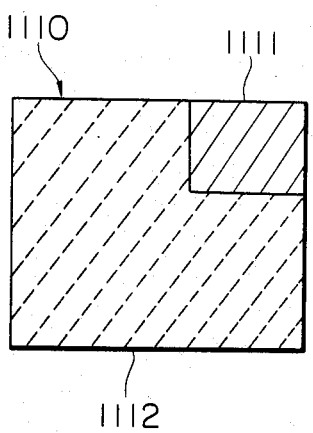
FIG. 18 is a diagram showing an example of the display areas according to a third embodiment of the invention

FIG. 18 shows display means 1100 including a sub-display area 1111 and a main display area 1112.

Figure 19:
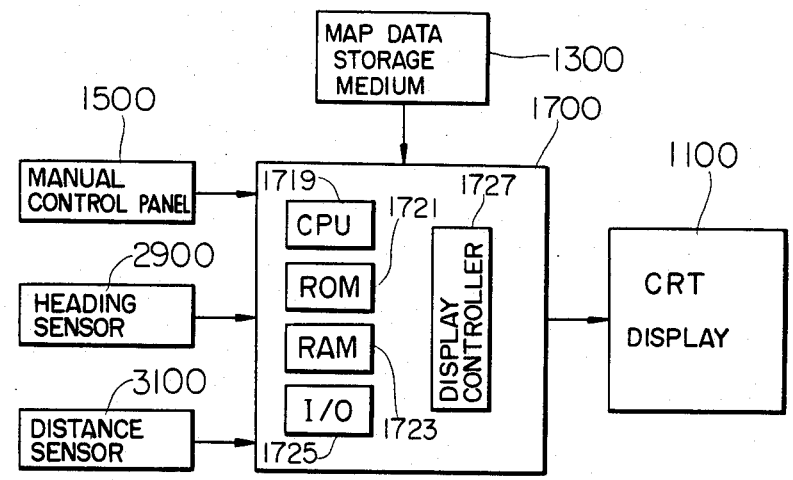
FIG. 19 is a block diagram showing the overall construction of the third embodiment.

FIG. 19 is a block diagram showing the overall construction of the third embodiment, in which numeral 1100 designates a CRT display serving as the display means, 1300 a map data storage medium of the same type as shown in the first and second embodiment, 1500 a manual control panel, 1700 an electronic control unit serving as control means and including a microcomputer having an CPU 1719, an ROM 1721, an RAM 1723 and an I/O device 1725 and a display controller 1727. CPU 1719 describes the code indicating that RAM 1723 is backed up, that is, supplied with power when the unit 1700 is first supplied with power. At least the command signals from the manual control panel 1500 are received and the required computational operations and display controls are performed in accordance with the command signals thereby making list displays, cursor displays and map displays on the CRT display 1100. Numeral 2900 designates a heading sensor for detecting the direction of movement of a vehicle or the direction of the earth's magnetic field with respect to the vehicle, and 3100 a distance sensor for detecting the distance traveled by the vehicle.

Figure 20:
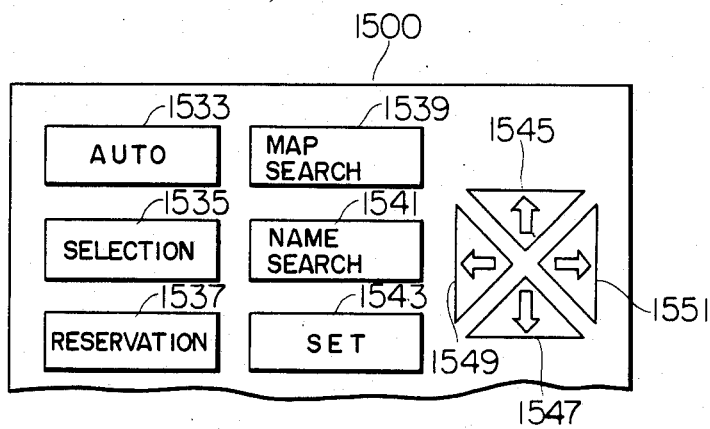
FIG. 20 is a diagram showing an example of the arrangement of operating keys on the control panel.

As shown in FIG. 20, the manual control panel 1500 includes at least an auto key 1533, a selection key 1535, a reservation key 1537, a map search key 1539, a name search key 1541, a set key 1543, an upward move cursor key 1545, a downward move cursor key 1547, a left move cursor key 1549 and a right move cursor key 1551 and the depression of each of these keys 1533, 1535, 1537, 1539, 1541, 1543, 1545, 1547, 1549 and 1551 supplies the corresponding command signal to the electronic control unit 1700.

Next, the processing of the electronic control unit 1700 will be described with reference to FIGS. 21 to 39.

Figure 21:
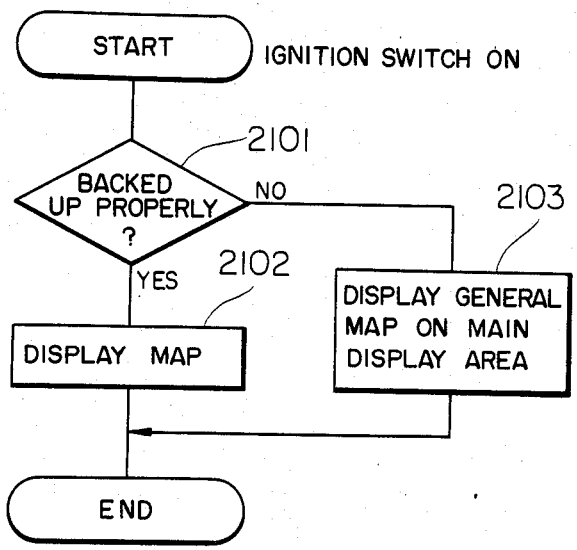

When the ignition switch (not shown) is turned on, the execution of the processing shown in FIG. 21 is started and then a step 2101 determines whether the memories (RAM) have been backed up properly on the basis of the code of the RAM 1723 described in the CPU 1729. If it is, then a step 2102 is performed so that the picture data which have already been stored in the RAM 1723, that is, the data relating to the map which was being displayed on the CRT display at the time that the ignition switch was turned off lately, are read from the RAM 1723 and the map is displayed on the map display area 1110 of the CRT display 1100 and the processing is ended. On the other hand, if the memories have not been backed up, a step 2103 is performed in place of the step 2102 so that a process is performed to display a general map on the main display area 1112 of the CRT display 1100 and the processing is ended. In this display process of the general map, the reduced scale required for displaying the general map on the main display area 1112 is selected and the coordinate conversion from the geographical coordinates (X,Y) to the display coordinates (x,y) is effected in accordance with the scale.

Figure 22:
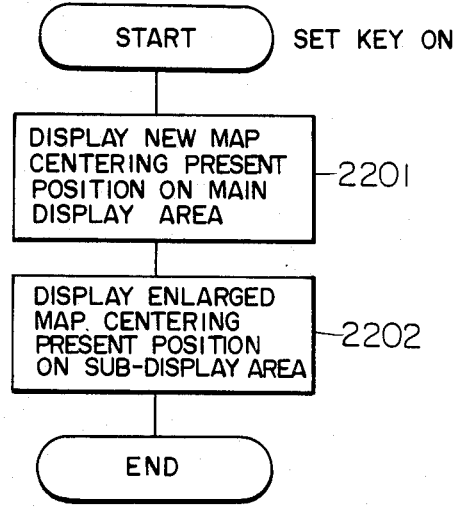
Figure 23B:
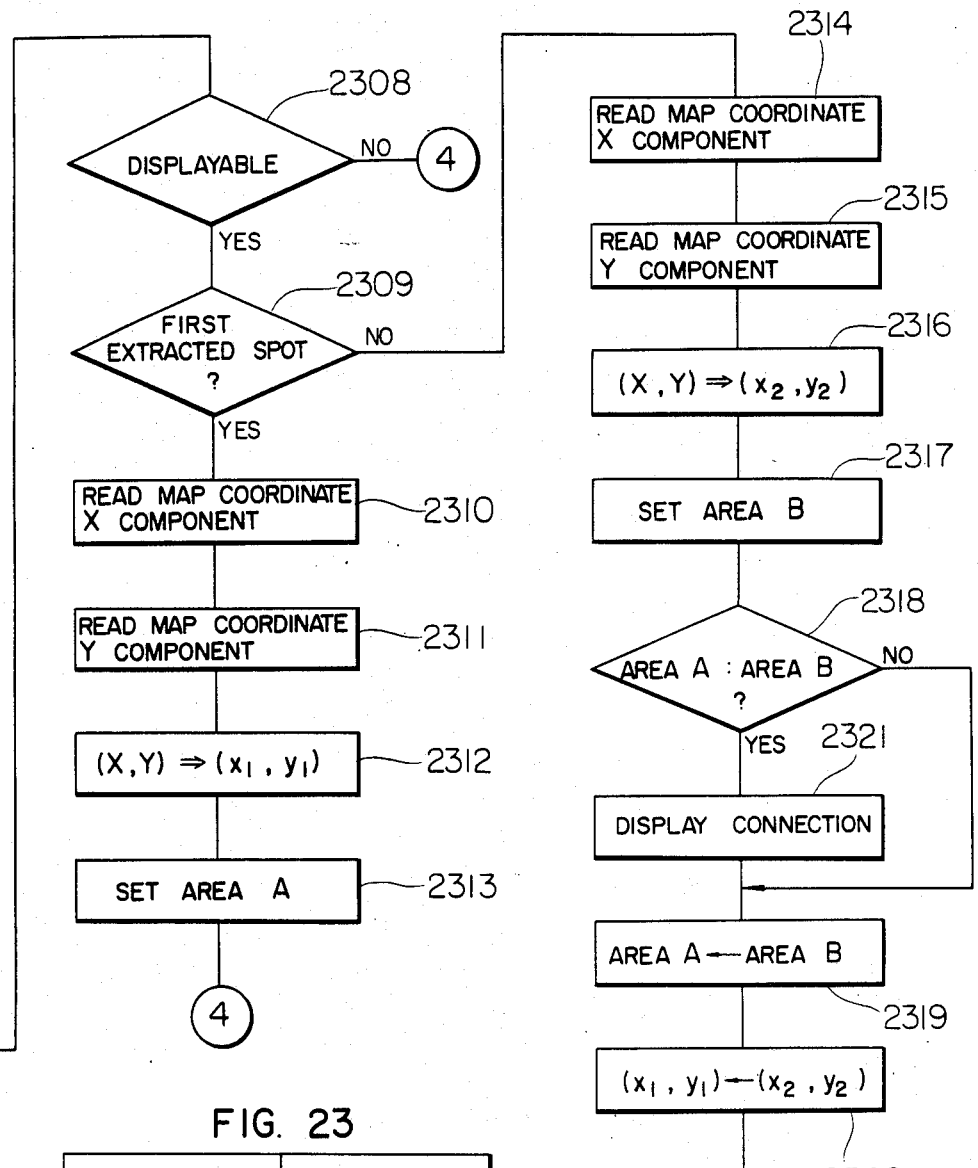
FIGS. 23a and 23b are flow charts showing the map display processing.
Figure 23:
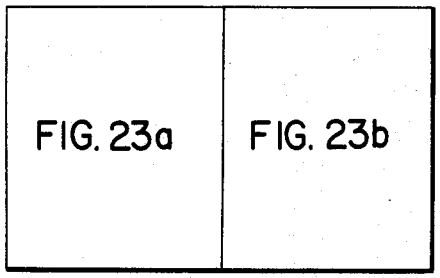
Figure 23A:
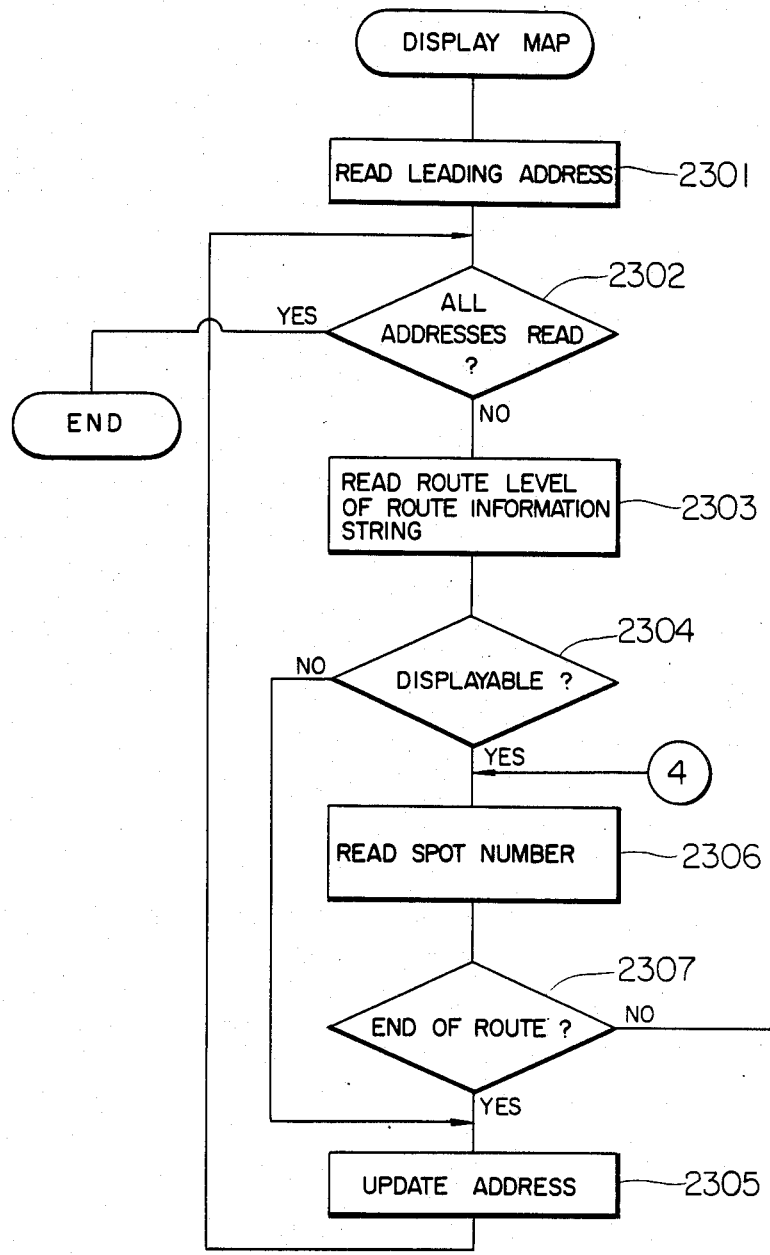

Then, after a present position mark displayed by superimposition on the map displayed by the step 2102 or 2103 has been moved and arranged at the present position on the displayed map through the operation of the cursor keys 1545 to 1551, the set key 1543 is turned on so that the execution of the processing shown in FIG. 22 is started and a step 2201 performs a process of displaying a new map centering the present position on the main display area 1112. Then, a step 2202 performs a process of displaying an enlarged map centering the present position on the sub-display area 1111 and the processing shown in FIG. 22 is ended.

The new map display process and the enlarged map display process performed at the steps 2201 and 2202, respectively, are as shown by the flow chart of FIG. 28 and a step 2301 is performed first to read the content of the leading address in the route information string of the map data in the ROM package 1300. Then, a step 2302 is performed to determine whether the contents of all the addresses have been read. Since this is just after the reading of the content of the leading address, the decision results in NO and then a step 2303 is performed. At the step 2303, the route level information of the ith route information string (the first route information string) designated by the ith address (the leading address at this time) is read out. Here, the route level information may be considered as a relative importance assigned to each route. Then, a step 2304 is performed to determine whether the route level is a display enable one, that is, whether the ith route (the first route) has an importance which enables its display with respect to the selected size. If the ith route (the first route) needs not be displayed, a step 2305 is performed so that the address is updated, that is, the content of the next address (the second address) is read out and a return is made to the step 2302. If the ith route (the first route) is to be displayed, then a step 2306 is performed to read the spot number information (the leading spot number information at this time) of the ith route information string (the first route information string). Then, a step 2307 is performed to determine whether the end of route information of the ith route information string (the first route information string) has been read out. Since this occurs just after the reading of the leading spot number information, the decision results in NO and then a step 2308 is performed thus reading the spot level information assigned to the spot number of the spot information string corresponding to the spot number concerned (the leading spot number) and thereby determining whether the spot number has an importance which enables its display with respect to the selected size. If this spot is one which needs not be displayed, a return is made to the step 2306 so that the next spot number of the ith route information string (the first route information string) is read out. On the contrary, if the spot is to be displayed, then a step 2309 is performed to determine whether the spot is the one extracted for the first time for the ith route information string (the first route information string). Since this is the first spot number thus far, the decision results in YES and steps 2310 to 2313 are then performed. Thus, the geographical coordinate X and Y components of the spot are read out and the coordinate point (X,Y) is then converted to a display coordinate point $(x_1, y_1)$ thereby determining an area A to which the display coordinate point $(x_1, y_1)$ belongs. As shown in FIG. 6a showing the geographical coordinate system and FIG. 6b showing the display coordinate system, this coordinate conversion process is effected in such a manner that (1) the point (MPOS, BPOS) is determined which corresponds to the coordinates (X,Y) of the geographical coordinate system having one-to-one correspondence to the origin (0,0) of the hatched area of the display coordinate system (corresponding to the main display area 1112 or the sub-display area 1111 of the CRT display 1100) and then (2) in accordance with the thus determined point (MPOS, BPOS) the coordinates (LPOS, APOS) of the spot in question are converted to the point $(x_1,y_1)$ of the display coordinate system. In this case, the point (MPOS, BPOS) is determined in the following manner. The present position is first determined as the displayed map center coordinates (MAPCENX, MAPCENY) on the map coordinate system and the point (MPOS, BPOS) is obtained from the following equations using as parameters the coordinate information MAPCENX and MAPCENY, the numbers of dots a and b in the map display area 1110 of the CRT display 1100 (FIG. 8) and the number of dots LDOT per unit longitude and the number of dots ADOT per unit latitude which are determined according to the selected size MPOS=MAPCENX−b/LDOT BPOS=MAPCENY+a/ADOT Then, the point $(x_1,y_1)$ is obtained from the following equations $$x_1=(\text{LPOS}-\text{MPOS})\times\text{LDOT}$$

$$y_1=(\text{BPOS}-\text{APOS})\times\text{ADOT}$$

On the other hand, the area determining process is effected by determining whether the display coordinate point $(x_1,y_1)$ obtained by the previously mentioned coordinate conversion process belongs to the main display area 1112 or the subdisplay area 1111. When the area A of the display coordinate point $(x_1,y_1)$ is determined at the step 2313 as described at the step 114 shown in FIG. 5b, a return is made to the step 2306 and the next spot number of the ith route information string (the first route information string) is read out. Then, the step 2307 is performed to determine whether the end of route information has been read out. If it is not, the step 2308 is performed to determine whether the spot level of the spot number is a display enable one. If it is not, a return is made to the step 2306. If it is, then the step 2309 is performed to determine whether the spot number is the one extracted for the first time for the ith route information string (the first route information string). Since the first spot number has already been extracted by this time, the decision result is NO and then steps 2314 to 2317 are performed successively thus performing the similar process as the steps 2310 to 2313. More specifically, the spot coordinates (X,Y) of the spot number (the jth spot number) are converted to the corresponding display coordinates $(x_2,y_2)$ and an area B of the display coordinates $(x_2,y_2)$ is obtained. Then, a step 2318 is performed to determine whether the connection between the point $(x_1,y_1)$ and the point $(x_2,y_2)$ is to be displayed, that is, whether the areas A and B are both the main display area 1112 or the sub-display area 1111. If at least one of the areas A and B is not the main display area 1112 or the subdisplay area 1111, then steps 2319 and 2320 are performed thus effecting an area updating process for changing the area B to the area A and a coordinate updating process for changing the coordinates $(x_2,y_2)$ to the coordinates $(x_1,y_1)$ and thereby making a return to the step 2306. On the other hand, if there is the above-mentioned particular relation, then a step 2321 is performed so that the connection between the point $(x_1,y_1)$ and the point $(x_2,y_2)$ is displayed on the display screen. Then, the steps 2319 and 2320 are performed so that the area updating process and the coordinate updating process are performed and a return is made to the step 2306. Thereafter, the route including the steps 2306, 2307 and 2308 and the route including the steps 2306, 2307, 2308, 2309 and 2314 to 2321 (the step 2321 is eliminated as occasion demands) are selectively performed thus making route displays until the end of route for the ith route (the first route) is read. Then, when the end of route for the ith route (the first route) is read out, the result of the decision of the step 2307 changes to YES and then the step 2305 is performed thereby performing an address updating process. Thus, the processing of the next route (the second route) is performed in the like manner as the processing of the first route. Thereafter, the similar processing is successively performed on each of the route information strings so that when the processing of the Nth route information string is completed, the step 2302 determines that the contents of all the addresses have been read out and the map display processing is ended.

Next, a searching method effected prior to the registration of a reserved map will be described with reference to FIGS. 24 to 34.

Figure 24:
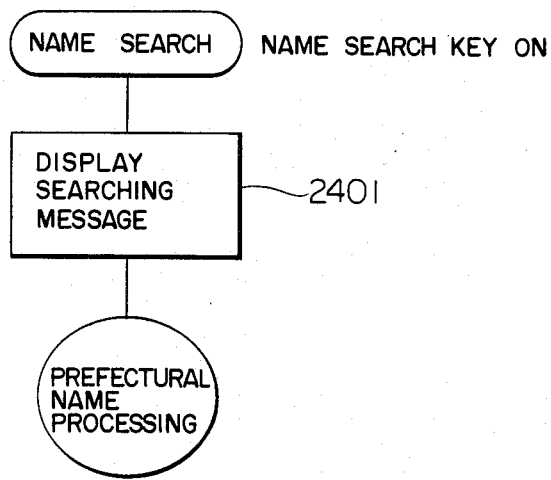
Figure 25:
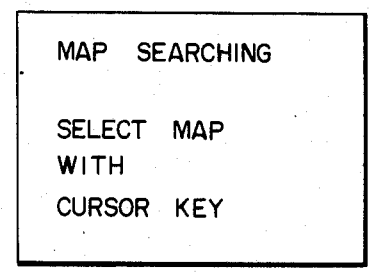
FIG. 25 is a diagram showing a display pattern on the CRT display made when the searching message display processing of FIG. 24 is performed.
Figure 26:
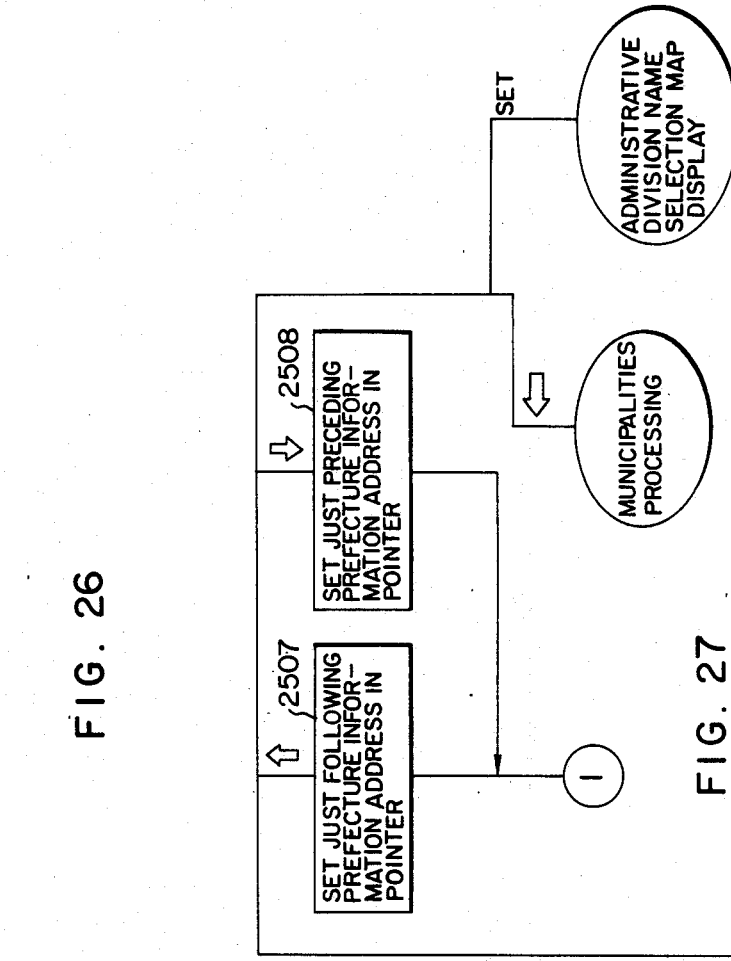
FIG. 26 is a flow chart showing the prefectural name processing of FIG. 24.
Figure 27:
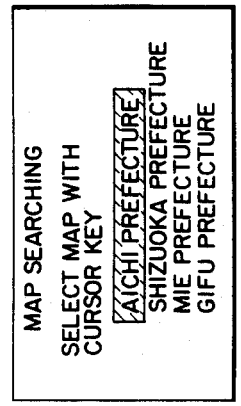
FIG. 27 is a diagram showing a display pattern made on the CRT display when the prefectural name processing of FIG. 26 is performed.
Figure 32:
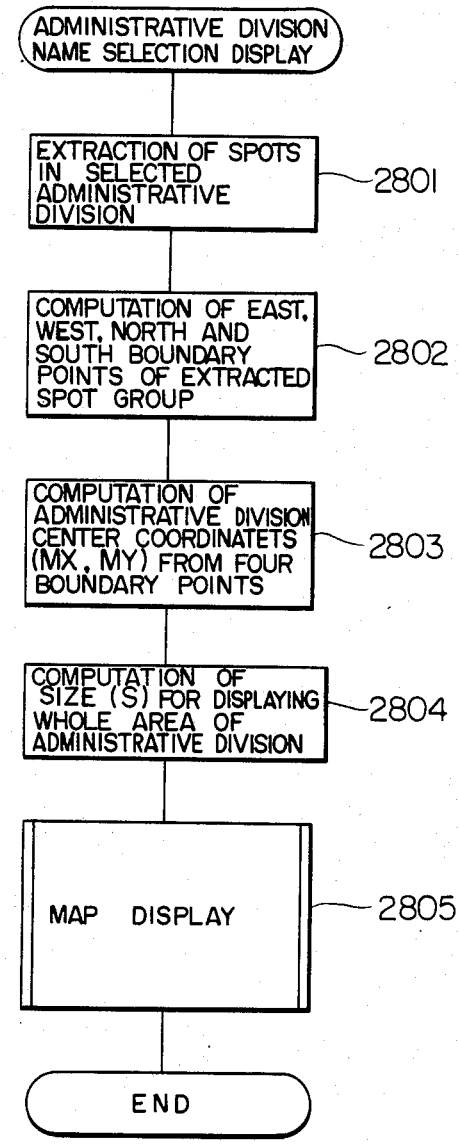
FIG. 32 is a flow chart showing the administrative division name selection map display processing of the municipalities name processing.

When the name search key 1541 of the manual control panel 1500 is turned on, the execution of the processing shown in FIG. 24 is started and a step 2401 first performs a process of displaying such a message as shown in FIG. 25 on the display area of the CRT display 1100. Then, a prefectural name processing as shown in FIG. 26 is performed. In this prefectural name processing, a step 2501 is performed first and the leading prefecture address is set in the pointer Then, a step 2502 is performed so that the administrative division name information is read from the prefectural information and this name and the cursor are displayed altogether on the screen of the CRT display 1100. Then, a step 2503 is performed to determine whether a predetermined number (the total number of prefectures which can be displayed by the map data) of prefectural names have been displayed. If the predetermined number of prefectural names have not been displayed as yet, then a step 2504 is performed so that the prefectural name of the next address is read out and displayed on the CRT display 1100. When the predetermined number of prefectural names have been displayed on the CRT display 1100 in this way, the result of the decision of the step 2503 changes to YES and then a step 2505 is performed. At the step 2505, a decision is made as to whether there is any key input from the manual control panel 1500. If it is, then a step 2506 is performed to determine whether the operated key is the upward move cursor key 1545 for moving the cursor position upward, the downward move cursor key 1547 for moving the cursor position downward, the left move cursor key 1549 for moving the cursor position to the left, the set key 1543 for displaying a map or any other key operated by mistake. If it is the upward move cursor key 1545, then a step 2507 is performed to newly set in the pointer the prefectural address which corresponds to the prefecture following the name of the prefecture corresponding to the present cursor position and a return is made to the step 2502. On the other hand, if it is determined that the downward move cursor key 1547 has been operated, then a step 2508 is performed to set in the pointer the prefectural information address of the prefecture which had previously corresponded to the cursor position and a return is made to the step 2502. If it is the left move cursor key 1549, then a municipalities process is started. On the other hand, if it is the set key 1543, then an administrative division name selection map display which will be described later with reference to FIG. 22 is performed. Thus, in accordance with the prefectural name processing the names of the prefectures belonging to the whole map displayed by the map data storage medium 1300 are displayed on the CRT display 1100 and also the cursor is displayed. In other words, such a picture as shown in FIG. 27 is displayed on the CRT display 1100. Next, the municipalities process will be described with reference to the flow chart of FIG. 28. In the Figure, steps 2601 to 2608 respectively correspond to the steps 2501 to 2508 of the prefectural name processing shown in FIG. 26. Thus, in the condition where the cursor position corresponds for example to Aichi Prefecture during the execution of the prefectural name processing, if the left move cursor key 1545 is operated, the names of the municipalities belonging to Aichi Prefecture are displayed. During the execution of the municipalities name process, if the right move cursor key 1531 is operated, then the previously mentioned prefectural name processing is started again. On the other hand, if the left move cursor key 1549 is operated, a spot name processing is started. FIG. 30 shows a flow chart of the spot name processing. In the Figure, steps 2701 to 2708 respectively correspond to the steps 2501 to 2508 of FIG. 26. In displaying the name in the step 2504 of FIG. 26, the step 2604 of FIG. 28 and the step 2704 of FIG. 30, the top address of the name information of the pointer mentioned earlier causes the name to be displayed by using the data of the name information corresponding to the top address. Thus, where the cursor position corresponds for example to Nagoya City as shown in FIG. 29, the operation of the left move cursor key 1549 causes the display pattern on the CRT display 1100 to change as shown in FIG. 31. Then, if the set key 1543 is operated during the spot name processing, a spot name selection map display processing is performed as will be described later with reference to FIG. 33. On the other hand, if the set key 1543 is operated during the execution of the prefectural name processing or the municipalities processing, an administrative division name selection map display processing as shown in FIG. 32 is started. In this processing, a step 2801 is performed first to extract the spot information of the spots belonging to the selected administrative division. Then, a step 2802 is performed to compute the four boundary points or the four points of the extracted spots which are respectively positioned at the eastern, western, northern and southern ends. Then, a step 2803 is performed so that the coordinates (MX, MY) of the center point of the administrative division are obtained from the four boundary points. This is obtained by performing the following calculations MX=(eastern end X coordinate+western end X coordinate)/2

MY=(northern end Y coordinate+southern end Y coordinate)/2

Figure 33:
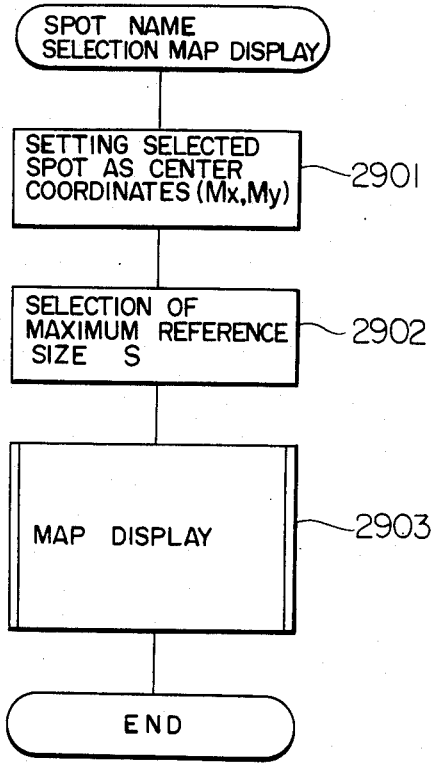
FIG. 33 is a flow chart showing the spot name selection map display processing of the spot name processing.

Then, a step 2804 is performed to compute the size required to permit the display of the whole area of the administrative division. Then, a step 2805 is performed so that the map of the administrative division is displayed on the CRT display 1100. This map display processing is the same as described in connection with FIG. 23. On the other hand, if the set key 1543 is operated during the execution of the spot name processing, a spot name selection map display processing as shown in FIG. 33 is started. In this map display processing, a step 2901 is performed first to set the selected spot as the center coordinates (Mx,My). Then, a step 2902 is performed to select a maximum reference size S which can be displayed centering the selected spot on the CRT display 1100. Then, a 2903 is performed so that a map corresponding to the selected scale S is displayed. This map display processing is the same as described in connection with FIG. 23.

Figure 34:
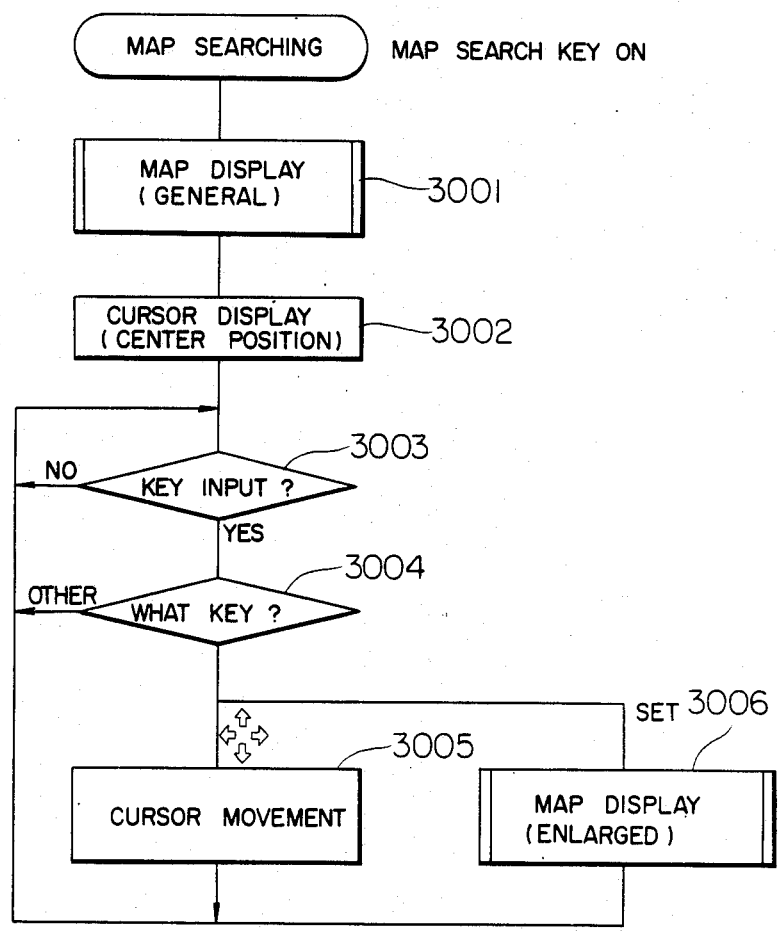

On the other hand, when the map search key 1539 of the manual control panel 1500 is turned on, a map search processing as shown in FIG. 34 is started. In this search processing, a step 3001 is performed first to make a map display of the whole map area which can be displayed on the CRT display 1100 in accordance with the map data in the ROM package 1300. Then, a step 3002 is performed so that the cursor is displayed at the center position of the map displayed. Then, a step 3003 is performed to determine whether there is any key input from the manual control panel 1500. If it is, a step 3004 is performed so as to determine the inputting key. If the inputting key is the cursor key 1545, 1547, 1549 or 1551, a step 3005 is performed so that the cursor is moved in accordance with the operated cursor key. On the other hand, if it is the set key 1543, a step 3006 is performed so that an enlarged map is now displayed.

Figure 35:
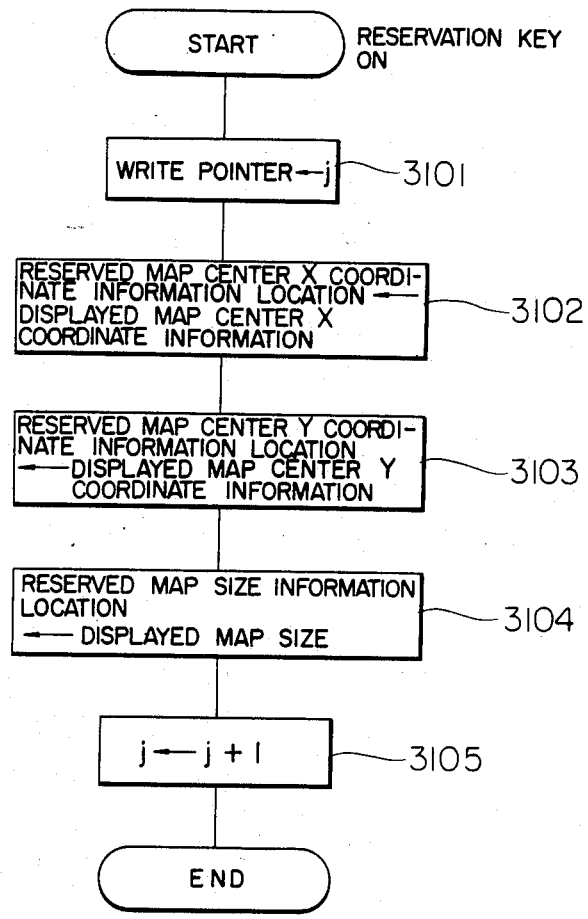
Figure 36:
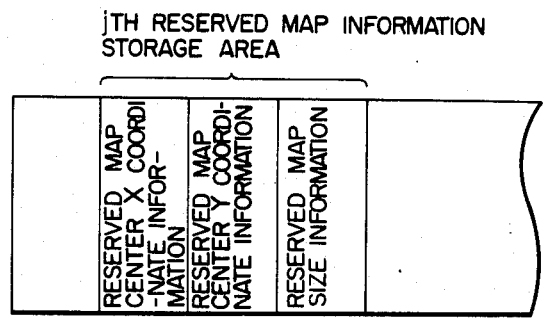
FIG. 36 is a diagram showing the arrangement of data stored in the jth reserved map information storage area by the processing of FIG. 35.

After the desired map has been displayed on the CRT display 1100 as the result of the name search processing or the map search processing, if the reservation key 1537 is turned on, a processing as shown in FIG. 35 is started. In this processing, a step 3101 is performed first so that the content of a write pointer for addressing the reserved map information storage area of the RAM 1723 is set to j. Then, a step 3102 is performed so that the X coordinate information of the center of the presently displayed map is written in the jth reserved map center X coordinate information storage location in the jth reserved map information storage area. Then, a step 3103 is performed so that the Y coordinate information of the said center is written in the reserved map center Y coordinate information storage location of the jth reserved map information storage area. Then, a step 3104 is performed so that displayed map size information is written in the reserved map information storage location of the jth reserved map information storage area. Then, a step 3105 is performed so that the content of j is incremented. Thus, the processing of FIG. 35 is ended. As a result, the information as shown in FIG. 36 are stored in the jth reserved map information storage area. Thus, each time the reservation key 1537 is turned on, the processing of FIG. 35 is performed and a reservation is made on the desired map.

Figure 37:
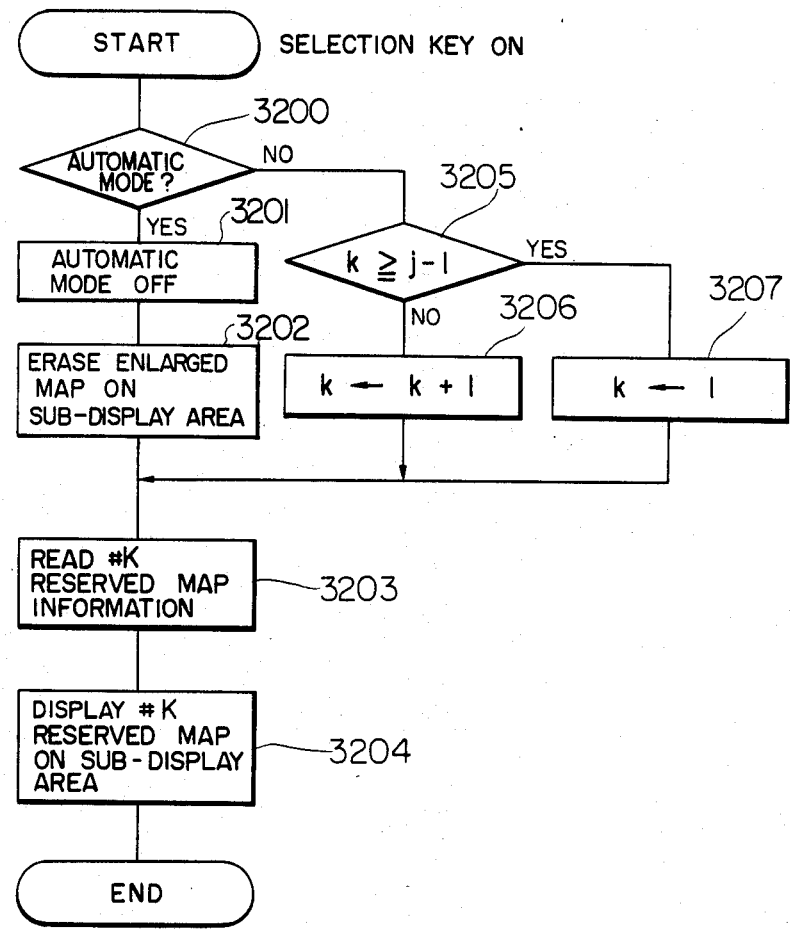
Figure 38:
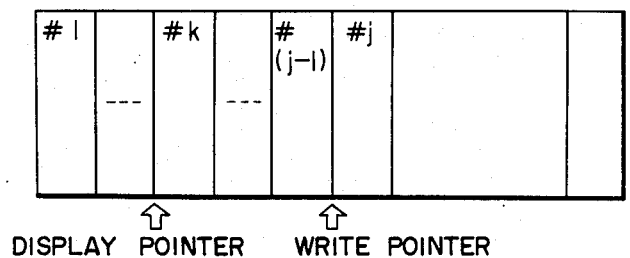
FIG. 38 is a diagram showing the relationship between the reserved map storage area and a display pointer and a write pointer.

FIG. 37 shows the processing which is started each time the selection key 1535 is turned on. In this processing, a step 3200 is performed first to determine whether the system is in an automatic mode, that is, whether an enlarged map centering the present position is currently displayed on the sub-display area 1111. If it is so determined, then a step 3202 is performed so that the enlarged map displayed on the sub-display area 1111 is erased after the step 3201 which is performed so that the automatic mode is off. Then, a step 3203 is performed to read the kth reserved map information designated by the display pointer as shown in FIG. 38, for example. Then, a step 3204 is performed so that the new map or the kth reserved map is displayed on the sub-display area 1111 and this processing is ended. On the other hand, if the step 3200 determines that the system is not in the automatic mode, then a step 3205 is performed to determine whether the value of k is (j−1) or greater (where j corresponds to the number of the reserved map information storage area designated by the write pointer as shown in FIG. 38). If it is not, then a step 3206 is performed so that the value of k is incremented first and the steps 3203 and 3204 are successively performed thus ending the processing. On the contrary, if the step 3205 determines that k≧(j−1), then a step 3207 is performed so that the value of k is set to 1 first and the steps 3203 and 3204 are successively performed thus ending the processing. Thus, in accordance with the present processing, if the system is in the automatic mode at the time the selection key 1535 is turned on, the presently displayed enlarged map centering the present position is erased and instead the reserved map is displayed. On the contrary, if the system is not in the automatic mode at the time the selection key 1535 is turned on, the next reserved map is displayed.

Figure 39:
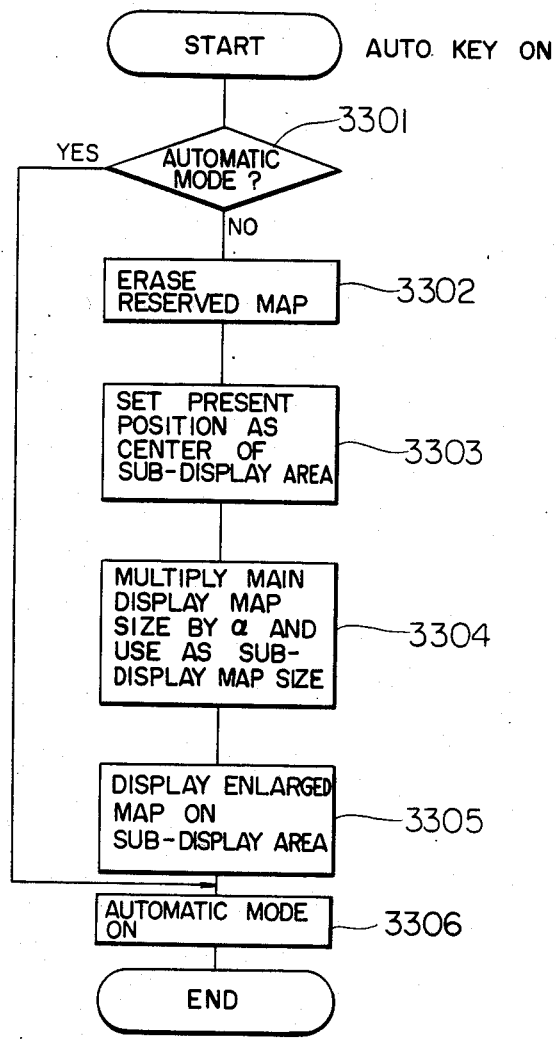

FIG. 39 shows the processing which is started each time the auto key 1533 is turned on. In this processing, a step 3301 is performed first to determine whether the system is presently in the automatic mode. If it is, the processing is ended without performing any operation. On the contrary, if it is not, then a step 3302 is performed so that the reserved map presently displayed on the subdisplay area 1111 is erased. Then, a step 3303 is performed so that the present position on the map displayed on the main display area 1112 is set as the center of the subdisplay area 1111. Then, a step 3304 is performed so that the size of the map displayed on the main display area 1112 is multiplied by α (α is greater than 1) and the size of a map to be displayed on the sub-display area 1111 is determined. Then, a step 3305 is performed thus displaying on the sub-display area 1111 a map which centers the present position and is enlarged to the new size obtained by multiplying the size of the main display map by α. A step 3306 is performed so that the automatic mode is on and the processing is ended.

After the enlarged map centering the present position has been displayed on the sub-display area 1111, if the vehicle advances and it is determined that the present position of the vehicle has reached a predetermined map display selection limit within the sub-display area 1111, a processing is performed so that an enlarged map centering the present position of the vehicle at that point is displayed anew. This map display processing is similar to the above-mentioned enlarged map display processing. In this case, the decision can be made by making a comparison between the display coordinates of the sub-display area 1111 corresponding to the map display selection limit and the display coordinates of the vehicle's present position on the sub-display area 1111 and thereby determining whether the present position of the vehicle has reached the map display selection limit.

Figure 40:
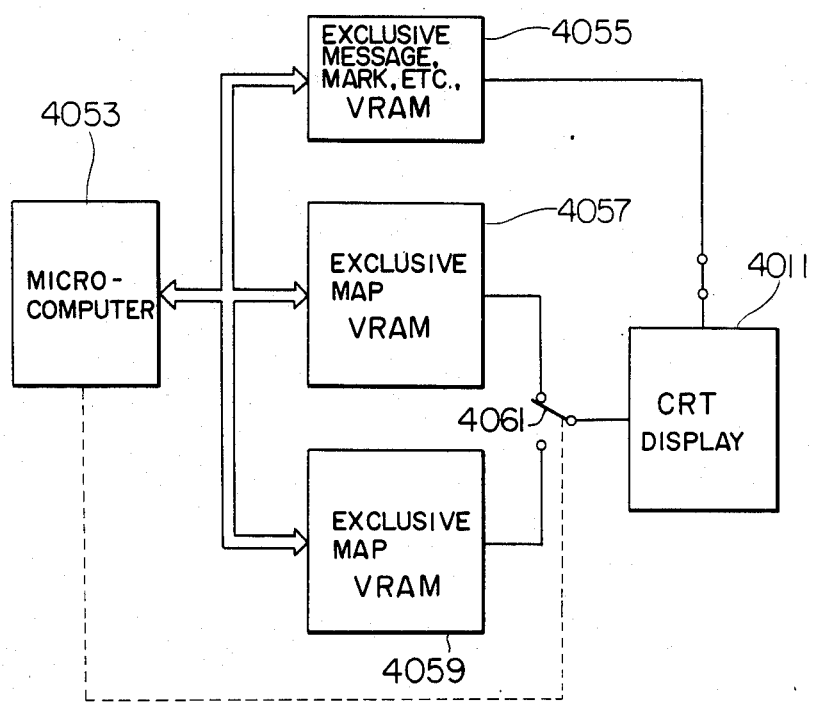
FIG. 40 is a block diagram showing the construction of still another embodiment of the invention.

FIG. 40 is a block diagram showing schematically a modification of the third embodiment of the invention. In the Figure, numeral 4053 designates a microcomputer, 4055 a video RAM (VRAM) used exclusively to store the data for displaying messages, marks, etc., on a CRT display 4011, 4057 a video RAM (VRAM) for storing the picture data of maps to be displayed on the CRT display 4011, 4059 an exclusive map video RAM (VRAM) used in the like manner as the exclusive map VRAM 4057, and 4061 switch means for switching the connections between the CRT display 4011 and the exclusive map VRAMs 4057 and 4059, respectively. These devices are controlled by instructions from the microcomputer 4053. This embodiment is operable in two display modes, i.e., a VRAM 1 display mode and VRAM 2 display mode. Thus, in the VRAM 1 display mode, the switch means 4061 is in the position shown and thus the map data from the exclusive map VRAM 4057 is sent to the CRT display 4011 thereby displaying the main display map on the screen of the CRT display 4011. In the interval, change map data is written in the other exclusive map VRAM 4059 so that upon completion of the writing the switch means 4061 changes its position and the change map is displayed on the sub-display area of the CRT display 4011. Also, in the VRAM 2 display mode, the map data from the exclusive map VRAM 4059 is sent to the CRT display 4011 and a map is displayed on the main display area of the CRT display 4011. In the interval, change map data is written in the exclusive map VRAM 4057 so that upon completion of the writing the switch means 4061 is returned to the illustrated position and a change map is displayed on the sub-display area of the CRT display 4011. Note that the exclusive message, mark, etc., VRAM 4055 is one which displays function messages, marks such as present position and destination and travel paths, and the VRAM 4055 is always connected to the CRT display 4011 so as to superimpose a message, marks or the like on the map displayed on the CRT display 4011. Since the present embodiment includes the two exclusive map VRAMs which are switched to alternately display a map on the CRT display 4011, it is possible to reduce the required map displaying time.

We claim:

1. A map display system, comprising:

display means for displaying maps;

designation means for designating a scale of a single map to be displayed;

memory means for storing a set of spot coordinates for every one of a plurality of spots to be used for constituting said single map and predetermined level information, for said spots, indicating a range of map scales which said spots are employed to generate said single map, each said set of spot coordinates indicating a point on a first coordinate system with respect to a predetermined coordinate reference point;

means for defining a region on said first coordinate system;

means for extracting from said memory means said sets of spot coordinates of said spots which have said level information indicating a range of scales encompassing said designated scale;

means for converting each of said spot coordinates extracted by said extracting means into display coordinates with respect to a predetermined point of a second coordinate system of said display means so that said single map of said region defined by said defining means is displayed on said display means; and map display control means for displaying on said display means said single map of said region on the basis of said display coordinates converted by said coverting means;

wherein each of said spots is assigned a separate said level information in the form of a spot level selected from a plurality of spot levels in accordance with the range of scales over which each of said spots is displayable, whereby said extracting means extracts said sets of spot coordinates for those spots having said spot level coorresponding to said designated scale in accordance with a predetermined relationship between scales and spot levels.

2. A map display system according to claim 1 wherein said designation means for designating the scale is actuated by manual operation.

3. A map display system according to claim 1 wherein said designation means includes:
  present position detecting means for detecting the present position of a running vehicle;
  destination setting means for setting the destination of the vehicle;
  distance calculating means for calculating the distance between said present position and said destination; and
  scale designating means responsive to the distance calculated by said distance calculating means for designating the scale of the map to be displayed.

4. A map display system according to claim 3 wherein said present position detecting means includes:
  heading detection means for detecting the heading of the travelling vehicle;
  distance detection means for detecting the running distance of the vehicle; and
  present position calculating means responsive to said detected heading and distance of the vehicle for calculating the present position of the vehicle.

5. A map display system according to claim 1, wherein said defining means defines said region on the basis of said scale designated by said designated means.

6. A map display system according to claim 1, wherein said defining means defines said region with a set of spot coordinates of the center of said region and said scale designated by said designated means.

7. A map display system according to claim 1, further comprising:
  means for changing said relationship between scales and spot levels, to increase or decrease the density of features illustrated in the map to be displayed.

8. A map display system, comprising:
  display means for displaying maps;
  designation means for designating a density of features to be displayed on a single map;
  memory means for storing for every one of a plurality of spots to be used for constituting said single map, a separate set of spot coordinates and a separate spot level, each said set of spot coordinates indicating a point on a first coordinate system with respect to a predetermined coordinate reference point, and said spot level being one of a plurality of spot levels assigned in accordance with a desired range of designated feature densities over which said spot is displayable;
  means for defining a region on said first coordinate system;
  means for extracting from said memory means said sets of spot coordinates of said spots which have said level information indicating a range of feature densities encompassing said designated density;
  means for converting each of said spot coordinates extracted by said extracting means into display coordinates with respect to a predetermined point of a second coordinate system of said display means so that said single map of said region defined by said defining means is displayed on said display means; and
  map display control means for displaying on said display means said single map of said region on the basis of said display coordinates converted by said converting means.

9. A map display system according to claim 8, wherein said defining means defines said region with a set of spot coordinates of the center of said region and a scale of said region.

10. A map display system, comprising:
  display means for displaying maps;
  designation means for designating a scale of a single map to be displayed;
  memory means for storing route information and a route level for every one of a plurality of routes to be used for constituting said single map, said route level indicating a range of map scales at which said route information is employed to generate said single map and being selected from one of a plurality of route levels in accordance with a desired range of designated scales over which the route is displayable;
  means for extracting from said memory means said route information of routes which have said route level indicating a range of scales encompassing said designated scale; and
  map display control means for displaying on said display means said single map of a particular region on the basis of said route information extracted by said extracting means;
  wherein each of said routes is assigned a separate said route level selected from a plurality of route levels in accordance with the range of scales over which each of said routes is displayable, whereby said extracting means extracts said route information for those routes having said route level corresponding to said designated scale in accordance with a predetermined relationship between scales and route levels.

11. A map display system, comprising:
  display means for displaying maps;
  designation means for designating a density of features to be displayed on a single map;
  memory means for storing route information and a route level for every one of a plurality of routes to be used for constituting said single map, said route level being one of a plurality of route levels assigned in accordance with a desired range of designated feature densities over which the route is displayable;
  means for extracting from said memory means said route information of said routes which have said route level indicating a range of feature densities encompassing said designated density; and
  map display control means for displaying on said display means said single map of a particular region on the basis of said route information extracted by said extracting means.

12. A map display system, comprising:
  display means for displaying maps;
  designation means for designating a scale of a single map to be displayed;
  memory means for storing, for each of a plurality of spots to be used for constituting said single map, a set of coodinates of every one of said spots and a spot level of every one of said spots, indicating a desired range of designated map scales at which each of said spots is employed to generate said single map;
  means, responsive to said memory means and designation means, for extracting from said memory means each said set of coordinates of said spots which have said spot level indicating a range of scales encompassing said designated scale; and means for creating said single map from said extracted coordinates and displaying said map on said display means;

wherein each of said spots is assigned a separate said spot level selected from a plurality of spot levels in accordance with the range of scales over which each of said spots is displayable, whereby said extracting means extracts said sets of spot coordinates for those spots having said spot level corresponding to said designated scale in accordance with a predetermined relationship between scales and spot levels.

13. A map display system, comprising:

display means for displaying maps;

designation means for designating a density of features to be displayed on a single map;

memory means for storing, for each of a plurality of spots to be used for constituting said single map, a set of coordinates of every one of said spots and a spot level of every one of said spots indicating a desired range of designated feature densities at which every one of spots is employed to generate said single map;

means, responsive to said memory means and designation means, for extracting from said memory means each said set of coordinates of said spots which have said spot level indicating a range of feature densities encompassing said designated density; and means for creating said single map from said extracted coordinates and displaying said map on said display means.

* * * * *